US008176346B2

(12) United States Patent
Kuroda et al.

(10) Patent No.: US 8,176,346 B2
(45) Date of Patent: May 8, 2012

(54) INFORMATION PROCESSING APPARATUS WITH POWER SAVING MODE AND METHOD FOR CONTROLLING INFORMATION PROCESSING APPARATUS

(75) Inventors: Yuji Kuroda, Tokyo (JP); Katsuhiko Yanagawa, Inagi (JP); Tomohiro Akiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 12/434,497

(22) Filed: May 1, 2009

(65) Prior Publication Data

US 2009/0276650 A1 Nov. 5, 2009

(30) Foreign Application Priority Data

May 2, 2008 (JP) ................................ 2008-120406
Mar. 30, 2009 (JP) ................................ 2009-082082

(51) Int. Cl.
*G06F 1/26* (2006.01)
*G06F 1/32* (2006.01)
*G06F 1/00* (2006.01)

(52) U.S. Cl. ......................... 713/320; 713/300; 713/323

(58) Field of Classification Search ........... 713/300–340
See application file for complete search history.

(56) References Cited

U.S. PATENT DOCUMENTS

| | | | | |
|---|---|---|---|---|
| 5,487,181 | A * | 1/1996 | Dailey et al. | 455/90.2 |
| 5,799,197 | A * | 8/1998 | Juso et al. | 713/323 |
| 6,609,210 | B1 * | 8/2003 | Onuma | 713/323 |
| 6,986,064 | B2 * | 1/2006 | Yoshimoto et al. | 713/300 |
| 7,346,791 | B2 * | 3/2008 | Kato et al. | 713/322 |
| 7,398,405 | B2 * | 7/2008 | Aoki et al. | 713/320 |
| 7,426,646 | B2 * | 9/2008 | Fujimoto | 713/300 |
| 7,617,407 | B2 * | 11/2009 | Adamo et al. | 713/320 |
| 7,702,930 | B2 * | 4/2010 | Yasumuro | 713/300 |
| 7,725,474 | B2 * | 5/2010 | Tamai et al. | 707/758 |
| 7,793,117 | B2 * | 9/2010 | Smith | 713/300 |

(Continued)

FOREIGN PATENT DOCUMENTS

EP 917154 A2 * 5/1999

(Continued)

OTHER PUBLICATIONS

Lee, J.; Rosenberg, C.; Chong, E.K.P.; , "An opportunistic power-saving mode and scheduler design for wireless local area networks," Wireless Communications and Networking Conference, 2006. WCNC 2006. IEEE , vol. 2, pp. 926-933.*

(Continued)

*Primary Examiner* — Faisal M Zaman
(74) *Attorney, Agent, or Firm* — Canon U.S.A., Inc., IP Division

(57) ABSTRACT

An information processing apparatus includes a storage unit configured to store data, a supply unit configured to supply electric power to the storage unit, a determination unit configured to determine whether to cause the information processing apparatus to operate in a power saving mode, a measuring unit configured to measure an elapsed time after a power source of the information processing apparatus is turned on and until the determination unit determines to cause the information processing apparatus to operate in a power saving mode, and a control unit configured to control the supply unit to decrease electric power supplied from the supply unit to the storage unit at a timing determined based on the elapsed time and a predetermined reference time, in case that the determination unit determines to cause the information processing apparatus to operate in a power saving mode.

7 Claims, 18 Drawing Sheets

U.S. PATENT DOCUMENTS

| | | | | |
|---|---|---|---|---|
| 7,802,060 | B2 * | 9/2010 | Hildebrand | 711/154 |
| 2001/0044907 | A1 * | 11/2001 | Yoshimoto et al. | 713/320 |
| 2002/0144057 | A1 * | 10/2002 | Li et al. | 711/112 |
| 2003/0126481 | A1 * | 7/2003 | Payne | 713/300 |
| 2003/0163747 | A1 * | 8/2003 | Yoshikawa | 713/323 |
| 2005/0125704 | A1 * | 6/2005 | Brauer | 713/320 |
| 2006/0136760 | A1 * | 6/2006 | Chotoku et al. | 713/300 |
| 2007/0016807 | A1 * | 1/2007 | Lim | 713/300 |
| 2007/0022309 | A1 * | 1/2007 | Adamo et al. | 713/300 |
| 2008/0235529 | A1 * | 9/2008 | Sugita | 713/324 |
| 2009/0193272 | A1 * | 7/2009 | Matsuzawa et al. | 713/320 |
| 2010/0127677 | A1 * | 5/2010 | Ohshima | 323/282 |
| 2010/0177216 | A1 * | 7/2010 | Odaka | 348/240.2 |

FOREIGN PATENT DOCUMENTS

| | | | | |
|---|---|---|---|---|
| JP | 2003196149 | A | * | 7/2003 |
| JP | 2005-186426 | A | | 7/2005 |
| JP | 2005346887 | A | * | 12/2005 |
| JP | 2006095739 | A | * | 4/2006 |
| JP | 2006164289 | A | * | 6/2006 |
| JP | 2006345068 | A | * | 12/2006 |
| JP | 2007250036 | A | * | 9/2007 |

OTHER PUBLICATIONS

Ju-Yong Kim; June-Whan Choi; Kyoung Choi; , "Design of automatic energy saving-monitor for reducing the waste of PC electricity," Networked Computing (INC), 2011 the 7th International Conference on , pp. 28-31, Sep. 26-28, 2011.*

Bolla, R.; Bruschi, R.; Davoli, F.; Cucchietti, F.; , "Energy Efficiency in the Future Internet: A Survey of Existing Approaches and Trends in Energy-Aware Fixed Network Infrastructures," Communications Surveys & Tutorials, IEEE , vol. 13, No. 2, pp. 223-244, Second Quarter 2011.*

Matsushita, Y.; , "Design for low electric power during standby state of fax-copier machine," Environmentally Conscious Design and Inverse Manufacturing, 1999. Proceedings. EcoDesign '99: First International Symposium on , pp. 391-395, Feb. 1-3, 1999.*

* cited by examiner

INFORMATION PROCESSING APPARATUS WITH POWER SAVING MODE AND METHOD FOR CONTROLLING INFORMATION PROCESSING APPARATUS

BACKGROUND OF THE INVENTION

1. Field of the Invention

The present invention relates to an information processing apparatus and a method for controlling an information processing apparatus.

2. Description of the Related Art

For the purpose of environmental protection, the consumption of large amounts of electric power in electronic devices is restricted. To this end, an information processing apparatus can be configured to operate in a power saving mode, according to which electric power supply to each module (such as a storage unit) of the apparatus can be selectively stopped if necessary.

For example, in order to reduce the consumption amount of electric power, it may be relatively simple to restrictively supply electric power to each module only when the electric power supply is necessary. However, the storage unit may tend to become damaged if the number of ON/OFF times increases. Therefore, if users frequently repeat the ON/OFF operation, a storage unit may be damaged at an earlier time compared to an expected product lifetime of an information processing apparatus that incorporates the storage unit. As a result, the information processing apparatus may fail to operate normally before the product lifetime expires. The number of ON/OFF times of a storage unit is a number of times assured for the storage unit, until which the electric power supply to the storage unit can be safely increased or decreased without causing any failure in the storage unit. The product lifetime of an information processing apparatus is an operation time assured for the information processing apparatus, during which the information processing apparatus can operate without failure.

An information processing apparatus can also set a standby time beforehand and, if the processing of a job that involves activation of a storage unit is completed, it may be useful to wait for a while (i.e., the standby time) before stopping electric power supplied to the storage unit.

In general, the standby time of a storage unit can be calculated based on a product lifetime of an information processing apparatus and the number of ON/OFF times assured for the storage unit. As discussed in Japanese Patent Application Laid-Open No. 2005-186426, the standby time may be obtained by dividing the product lifetime of the apparatus by the number of ON/OFF times assured for the storage unit. In this case, the apparatus is controlled to continuously supply electric power to the storage unit until the standby time has elapsed.

However, the system discussed in the Japanese Patent Application Laid-Open No. 2005-186426 may not be able to easily stop electric power supplied to the storage unit, even though the system may be able to prevent the number of ON/OFF times of the storage unit from exceeding a predetermined value before the product lifetime of the apparatus expires. The number of ON/OFF times of a storage unit is a number of times assured for the storage unit, until which the electric power supply to the storage unit can be safely increased or decreased without causing any failure in the storage unit.

SUMMARY OF THE INVENTION

According to one aspect of the invention, an information processing apparatus is provided that includes a storage unit configured to store data, a supply unit configured to supply electric power to the storage unit, a determination unit configured to determine whether to cause the information processing apparatus to operate in a power saving mode, a measuring unit configured to measure an elapsed time after a power source of the information processing apparatus is turned on and until the determination unit determines to cause the information processing apparatus to operate in a power saving mode, and a control unit configured to control the supply unit to decrease electric power supplied from the supply unit to the storage unit at a timing determined based on the elapsed time and a predetermined reference time, in case that the determination unit determines to cause the information processing apparatus to operate in a power saving mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

Figure 1:
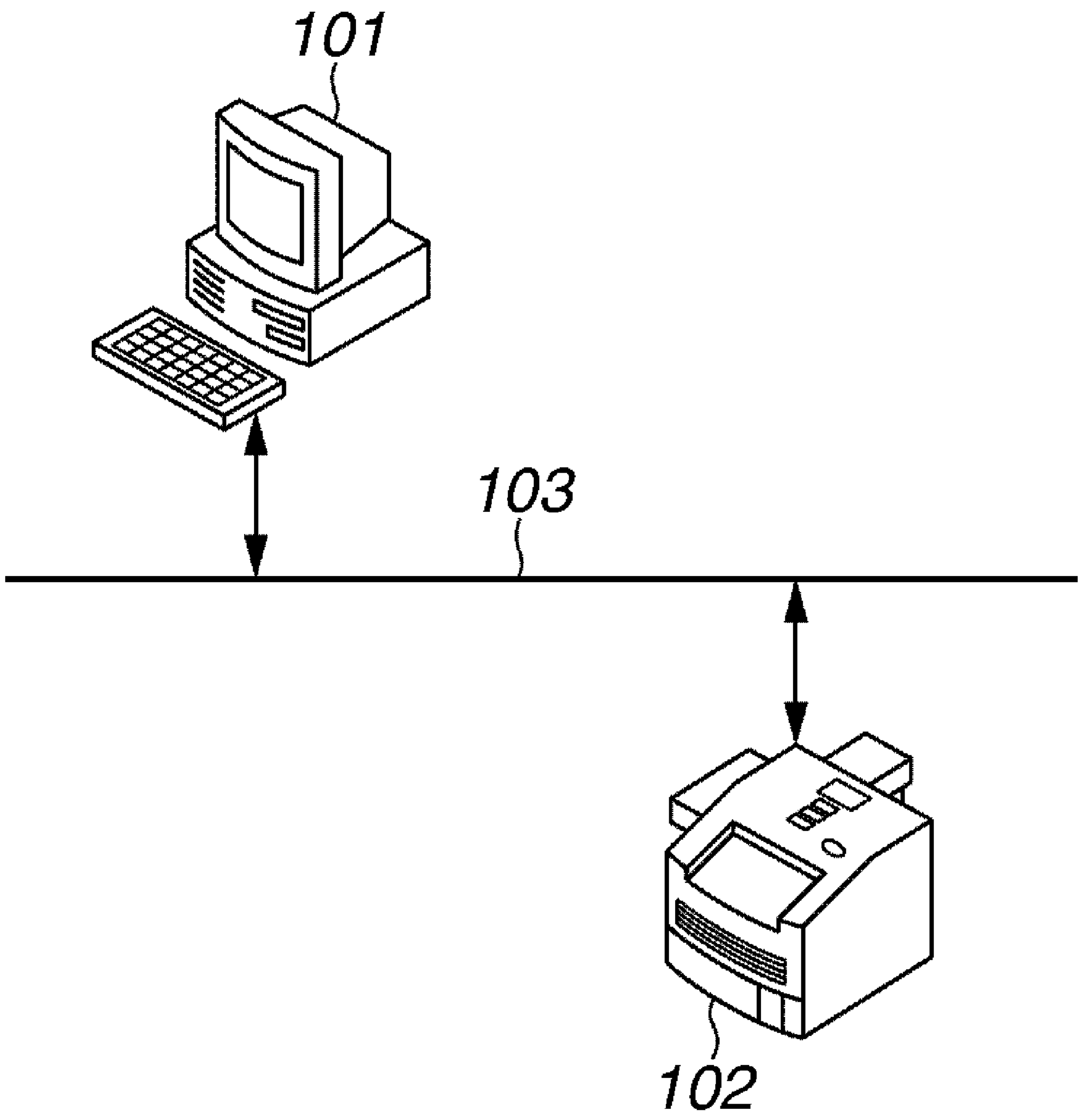
FIG. 1 illustrates a configuration of a system according to a first exemplary embodiment.

Various exemplary embodiments, features, and aspects of the invention will be described in detail below with reference to the drawings. In the drawings, elements and parts which are identical throughout the views are designated by identical reference numerals, and duplicate description thereof is omitted.

FIG. 1 illustrates a configuration of a system according to a first exemplary embodiment. The system illustrated in FIG. 1 includes a personal computer (i.e., PC) 101, a printer 102, and a network 103. The PC 101 and the printer 102, which are connected via the network 103, can perform processing for transmitting and receiving data (e.g., image data) via the network 103. The connection between the PC 101 and the printer 102 may be realized by a local connection.

Figure 2:
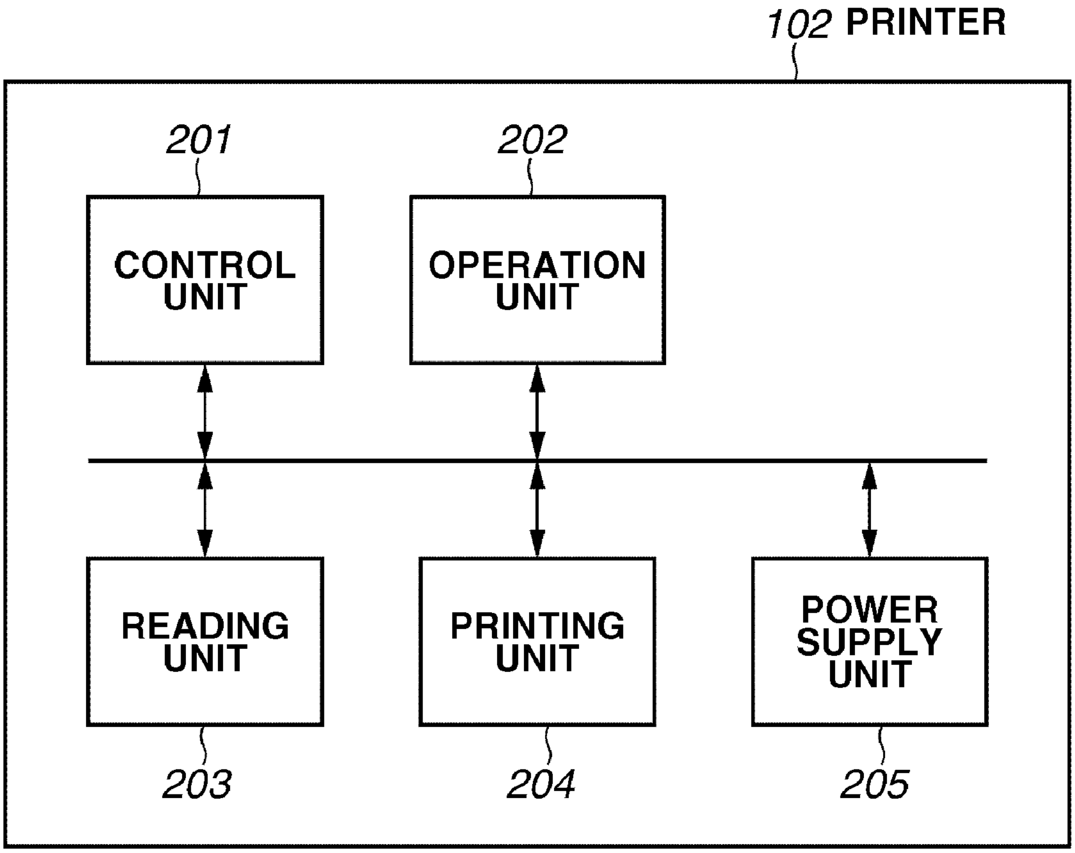
FIG. 2 is a block diagram illustrating a configuration of a printer according to the first exemplary embodiment.

FIG. 2 is a block diagram illustrating a configuration of the printer 102 according to the first exemplary embodiment. The printer 102 is an example of an information processing apparatus according to the present exemplary embodiment. However, the information processing apparatus according to another exemplary embodiment may also be an apparatus other than the printer 102.

The printer 102 includes a control unit 201 that can control an operation unit 202, a reading unit 203, a printing unit 204, and a power supply unit 205. Namely, the control unit 201 can control the constituent components 202 to 205 of the printer 102. The control unit 201 is described below in more detail with reference to FIG. 3. The operation unit 202 may include a display unit and an input unit. In one version, the display unit may provide an operation screen that enables users to operate the printer 102. The input unit may accept various operations entered by users to operate the printer 102. The reading unit 203 can read image data from an original (e.g., a paper document) and can input the read image data to the control unit 201. When the printing unit 204 receives image data processed by the control unit 201, the printing unit 204 can execute processing for forming an image on an output sheet based on the received image data. The power supply unit 205 can supply electric power to the constituent components 201 to 204 of the printer 102.

Figure 3:
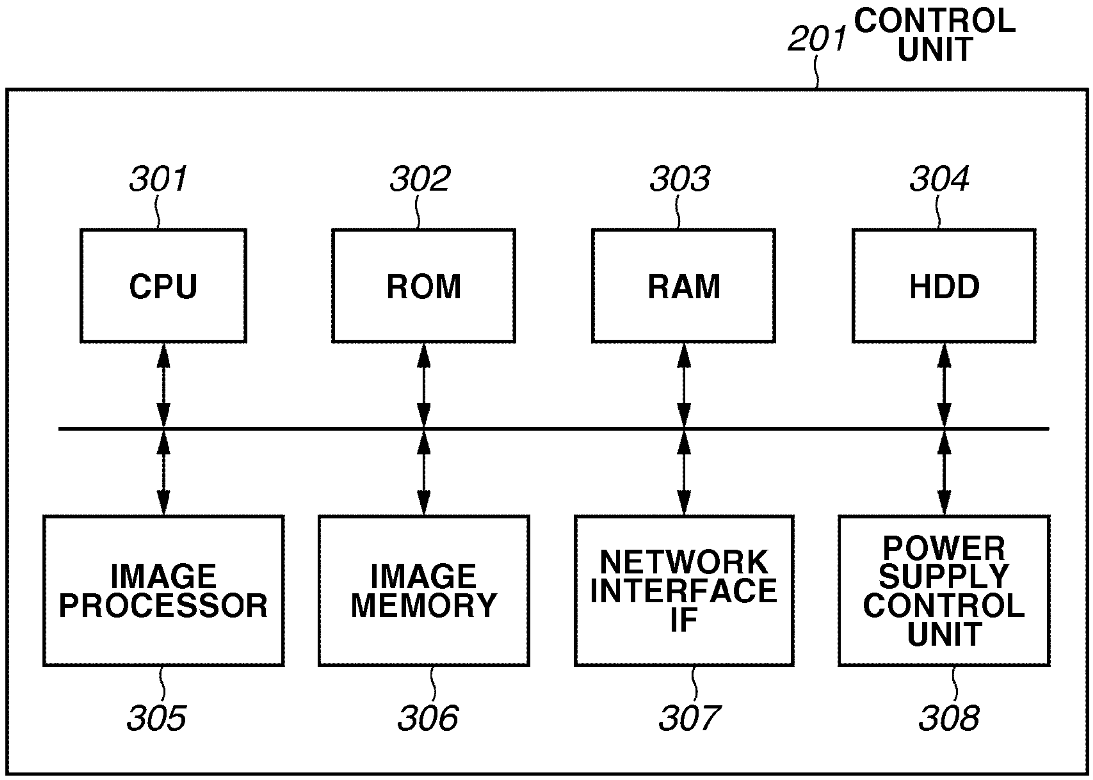
FIG. 3 is a block diagram illustrating a configuration of a control unit according to the first exemplary embodiment.

FIG. 3 is a block diagram illustrating a configuration of the control unit 201 according to the first exemplary embodiment. The control unit 201 includes a central processing unit (i.e., CPU) 301, a read only memory (i.e., ROM) 302, a random access memory (i.e., RAM) 303, a hard disk drive (i.e., HDD) 304, an image processor 305, an image memory 306, a network interface (i.e., IF) 307, and a power supply control unit 308.

The CPU 301 can control the constituent components 202 to 205 of the printer 102 and the constituent components 302 to 308 of the printer control unit 201 based on programs rasterized into the RAM 303. The ROM 302, which may be constituted by a nonvolatile storage medium, may store a boot program that can be executed by the CPU 301. The RAM 303, which may be constituted by a volatile storage medium, is a storage medium into which the OS or application programs executed by the CPU 301 can be rasterized from the HDD 304. The HDD 304, which may be constituted by a nonvolatile storage medium, may store the OS and the application programs that the CPU 301 can execute. The image processor 305 can execute various processing on image data stored in the image memory 306.

The image memory 306, which may be constituted by a volatile storage medium, can temporarily store image data received from the reading unit 203 or the network IF 307. The network IF 307 can input and output image data from and to an external apparatus (e.g., the PC 101). The power supply control unit 308 can switch the state of electric power supplied from the power source unit 205 to the constituent components 201 to 204 of the printer 102 and to the constituent components 301 to 307 of the control unit 201.

Figure 4:
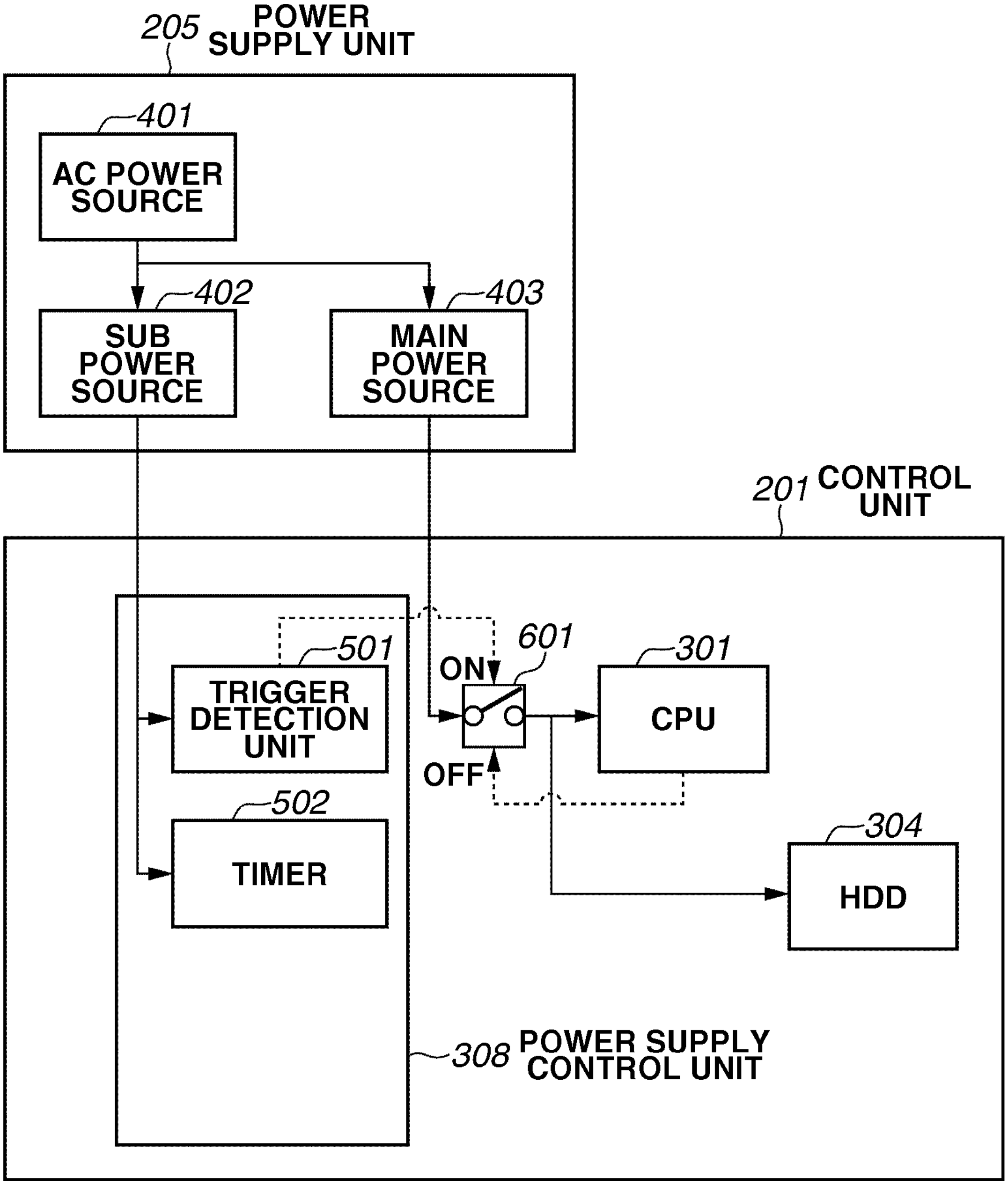
FIG. 4 is a circuit diagram illustrating a state of electric power supplied to constituent components of a power source unit and a configuration of power supply control for constituent components of a CPU and a power supply control unit according to the first exemplary embodiment.

FIG. 4 is a circuit diagram illustrating a state of electric power supplied to constituent components of the power source unit 205 and a configuration of power supply control for constituent components of the CPU 301 and the power supply control unit 308 according to the first exemplary embodiment. In FIG. 4, an arrow of a solid line indicates a power supply route and an arrow of a dotted line indicates a power supply control route.

An alternating-current (AC) power source 401 can supply electric power to a sub power source 402 and a main power source 403. The sub power source 402 can supply electric power to constituent components of the power supply control unit 308. The main power source 403 can supply electric power to the CPU 301 and the HDD 304 via an ON/OFF switching unit 601. The main power source 403 may be configured to supply electric power, via an ON/OFF switching unit, to the constituent components 201 to 205 of the printer 102 and the constituent components 301 to 307 of the control unit 201.

A trigger detection unit 501 can detect an input data received from the operation unit 202, the reading unit 203, or the network IF 307. The trigger detection unit 501 can turn the ON/OFF switching unit 601 on in response to the input data. A timer 502 can measure a power ON time of the printer 102. The timer 502 may also be able to measure a power OFF time of the printer 102, for example, using a battery.

The ON/OFF switching unit 601 performs ON/OFF switching operations under the control of the CPU 301 and the trigger detection unit 501, to supply electric power from the main power source 403 to the CPU 301 and the HDD 304. In the first exemplary embodiment, the trigger detection unit 501 performs ON control for the ON/OFF switching unit 601 while the CPU 301 performs OFF control for the ON/OFF switching unit 601. As a result, the CPU 301 and the HDD 304 can be turned on and off in response to the ON/OFF switching of the ON/OFF switching unit 601.

Figure 5:
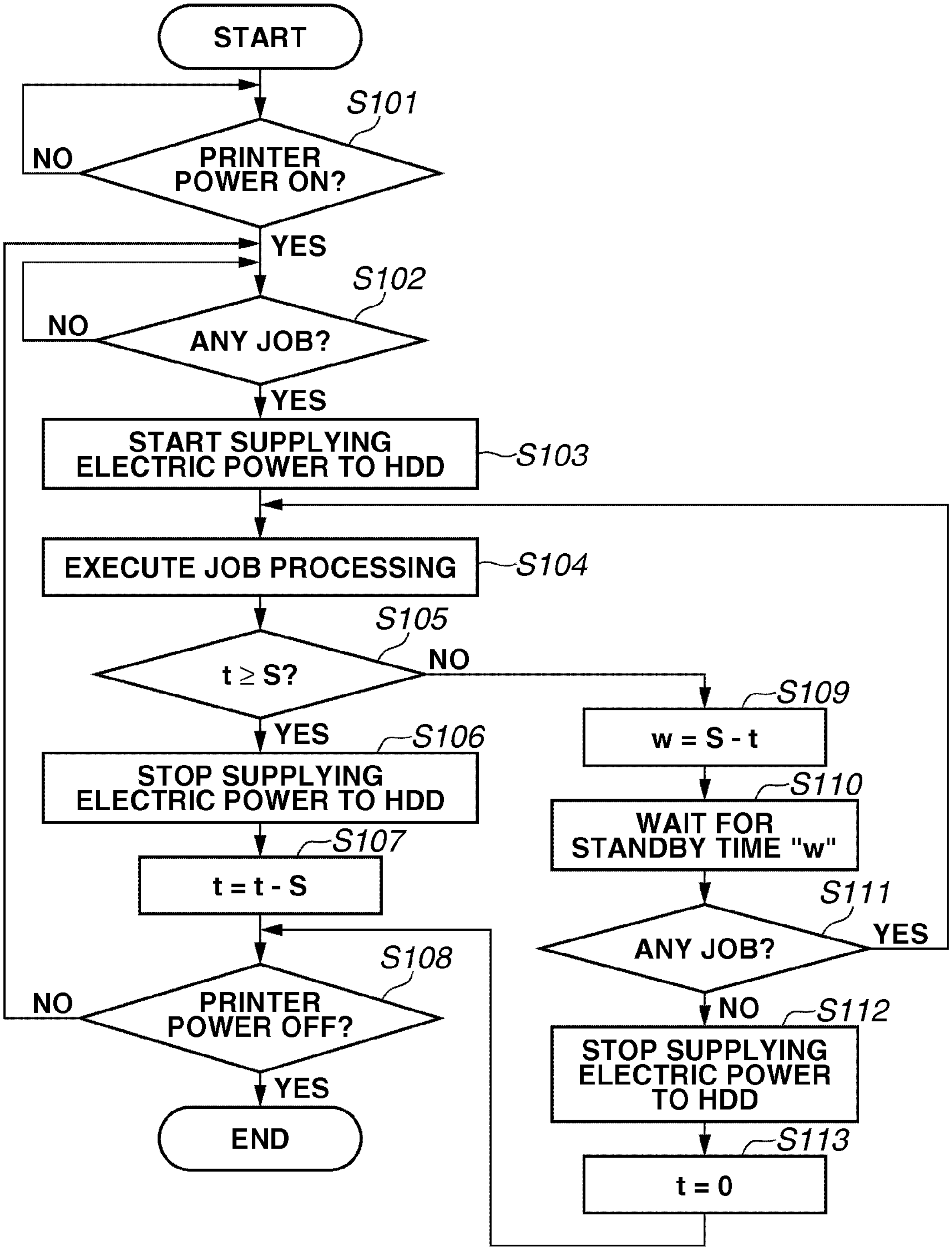
FIG. 5 is a flowchart illustrating example control that can be performed by the printer according to the first exemplary embodiment.

FIG. 5 is a flowchart illustrating example control that can be performed by the printer 102 according to the first exemplary embodiment. In one version, to execute the control processing of the flowchart illustrated in FIG. 5, the CPU 301 reads and executes a program loaded into the RAM 303 from the HDD 304.

In the exemplary embodiment, the job includes a reading job performed by the reading unit 203, a print job performed by the printing unit 204, an operation response job performed by the operation unit 202, and a network response job performed by the network IF 307. The above-described jobs are roughly classified into a job group that involves, and may even require activation of the HDD 304, and another job group that does not involve (i.e., may not require) activation of the HDD 304. In general, the reading job and the print job belong to the job group that involved and may even require activation of the HDD 304. The operation response job and the network response job belong to the job group that does not involve activation of the HDD 304.

In step S101, the CPU 301 determines whether the power source of the printer 102 is turned on. If in step S101 the CPU 301 determines that the power source of the printer 102 is in an ON state (YES in step S101), the processing proceeds to step S102. If it is determined that the power source of the printer 102 is in an OFF state (NO in step S101), then step S101 is repeated. When the processing proceeds to step S102, the CPU 301 causes the timer 502 to start measuring the elapsed time "t."

In step S102, the CPU 301 determines whether there is any input job. The trigger detection unit 501 detects a trigger of the input job. If in step S102 the CPU 301 determines that an input job is present (YES in step S102), then processing proceeds to step S103, where the trigger detection unit 501 performs the ON control for the ON/OFF switching unit 601 to start supplying electric power to the HDD 304. If it is determined that there is no input job present (NO in step S102), then step S102 is repeated. In step S104, the CPU 301 executes job processing. More specifically, to perform the job processing, the CPU 301 controls a constituent component of the printer 102, which may be used to process a job (i.e., a processing object), according to a job type. If the processing of step S104 is completed and there is not any subsequent job to be processed next, the CPU 301 determines that the present state satisfies a condition for stopping electric power supplied from the power source unit 205 to the HDD 304 via the ON/OFF switching unit 601. The processing proceeds to step S105.

In step S105, the CPU 301 determines whether the elapsed time "t" is equal to or greater than a reference time "S." In other words, the CPU 301 determines whether to stop the electric power supplied to the HDD 304 based on a comparison result. The elapsed time "t" is a time that can be measured by the timer 502 until the processing proceeds to step S105. The reference time "S" represents a standby time for the HDD 304, which is generally a fixed value. The reference time "S" is time information that can be referred to by the CPU 301 to determine whether to stop the electric power supplied to the HDD 304. When "P" represents the product lifetime of the printer 102 and "H" represents the number of ON/OFF times that is assured for the HDD 304, a formula S=P/H may define the reference time "S."

The reference time "S" can be stored in the HDD 304 and can optionally be loaded into the RAM 303. The printer 102 may calculate the reference time "S." The HDD 304 may store the reference time "S" beforehand. If in step S105 the CPU 301 determines that the elapsed time "t" is equal to or greater than the reference time "S" (YES in step S105), the processing proceeds to step S106. If in step S105 the CPU 301 determines that the elapsed time "t" is less than the reference time "S" (NO in step S105), the processing proceeds to step S109.

In step S106, i.e., when the elapsed time "t" is equal to or greater than the reference time "S" in step S105, the CPU 301 executes the OFF control for the ON/OFF switching unit 601 to stop the electric power supplied to the HDD 304 at this timing (i.e., a first timing). In step 106, the CPU 301 may also wait for a predetermined time before stopping the electric power supplied to the HDD 304.

In step S107, the CPU 301 subtracts the reference time "S" from the elapsed time "t." In step S108, the CPU 301 determines whether the power source of the printer 102 is turned off. If in step S108 the CPU 301 determines that the power source of the printer 102 is in an OFF state, the CPU 301 terminates the processing of the routine illustrated in FIG. 5. When the power source of the printer 102 is turned off, the timer 502 terminates the measurement of the elapsed time "t." When the power source of the printer 102 is turned off (YES in step S108), the CPU 301 stores the value of the elapsed time "t" in the HDD 304. The CPU 301 reads the stored value of the elapsed time "t" from the HDD 304 when the power source of the printer 102 is turned on in the next processing of step S101. If in step S108 the CPU 301 determines that the power source of the printer 102 is in an ON state (NO in step S108), the processing returns to step S102.

If in step S105 the CPU 301 determines that the elapsed time "t" is less than the reference time "S" (NO in step S105), then processing proceeds to step S109, where the CPU 301 calculates a value of a predetermined standby time "w." The standby time "w" is a time set as a temporal duration from a termination of the job processing in step S104 to an initiation of HDD power supply stop processing in step S112, in a state where no job is input in the printer 102. The standby time "w" can be calculated by subtracting the elapsed time "t" from the reference time "S". Then, in step S110, the CPU 301 waits for a predetermined time that is equivalent to the standby time "w" calculated in step S109, while continuously supplying electric power to the HDD 304.

In step S111, the CPU 301 determines whether any job is input in the standby state of step S110. If in step S111 the CPU 301 determines that an input job is present (YES in step S111), the processing returns to step S104. If in step S111 the CPU 301 determines that there is not any input job (NO in step S111), the processing proceeds to step S112. In step S112, the CPU 301 executes the OFF control for the ON/OFF switching unit 601 to stop the electric power supplied to the HDD 304 at this timing (i.e., second timing). In step S113, the CPU 301 resets the elapsed time "t" to 0. After completing the processing of step S113, the processing proceeds to step S108.

In the above-described example, the timer 502 measures the elapsed time only when the power source of the printer 102 is in a turned-on state. However, the timer 502 can continuously measure the elapsed time even after the power source of the printer 102 is turned off. In this case, only when the processing initially proceeds to step S102 after starting the operation of the printer 102, the timer 502 starts measuring the elapsed time "t." When the CPU 301 terminates the processing, the timer 502 does not stop measuring the elapsed time "t" and continuously measures the elapsed time "t" even after the processing is terminated.

In the above-described processing in step S106 or step S112, the CPU 301 stops supplying electric power to the HDD 304. Alternatively, the CPU 301 can reduce the amount of electric power supplied to the HDD 304. For example, as a method for reducing the electric power supplied to the HDD 304, it is possible to stop the electric power supplied to a motor that is configured to rotate a disk of the HDD 304. In this state, the CPU 301 cannot read and write data from and to the HDD 304.

Figure 6:
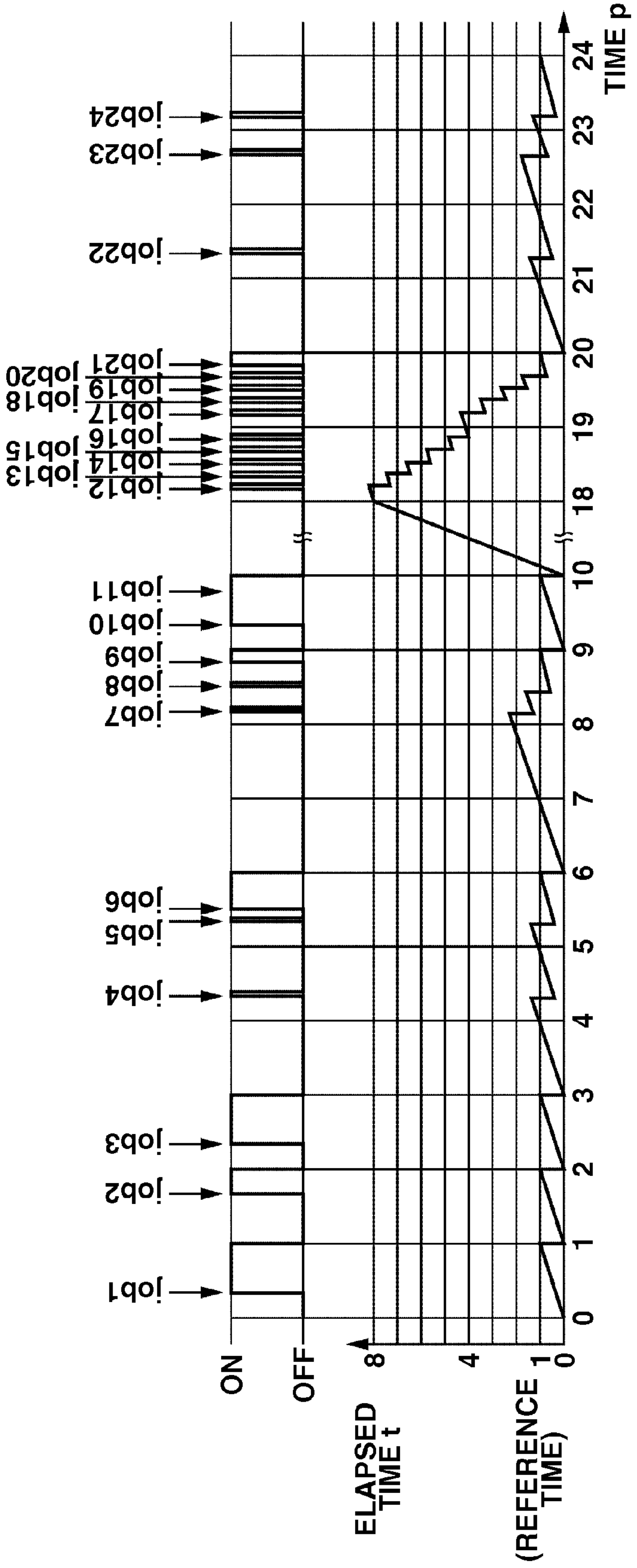
FIG. 6 illustrates an example of a relationship between an elapsed time measured by a timer and an operation time of the printer, the count-up of which starts upon turning on the power source, according to the first exemplary embodiment.

FIG. 6 illustrates an example of a relationship between the elapsed time "t" measured by the timer 502 and an operation time "p" of the printer 102, the count-up of which starts upon turning on the power source, in the first exemplary embodiment. FIG. 6 illustrates, in its lower part, a transition of the elapsed time "t" when the reference time "S" is one hour and illustrates, in its upper part, a corresponding transition of the ON/OFF state of the power source of the HDD 304. In FIG. 6, the scale of the abscissa is sufficiently large compared to a processing time of each job, which is finished immediately upon entering in FIG. 6.

At the moment when the processing of a job 1 or a job 2 is completed, the elapsed time "t" is less than the reference time (=one hour). Therefore, the CPU 301 waits for a while until the elapsed time "t" reaches one hour and then the CPU 301 stops the electric power supplied to the HDD 304. This procedure corresponds to a case where the processing proceeds from step S105 to step S109. On the other hand, at the moment when the processing of a job 4 or a job 5 is completed, the elapsed time "t" is longer than the reference time (=one hour). Therefore, the CPU 301 immediately stops the electric power supplied to the HDD 304. This procedure corresponds to a case where the processing proceeds from step S105 to step S106.

If a long time has elapsed in a state where no electric power is supplied to the HDD 304, for example, when the time "p" is in the duration from 10 to 18 hours, the elapsed time "t" increases correspondingly. As a result, the CPU 301 can continuously execute the processing for stopping electric power supplied to the HDD 304, after the job processing is completed, until the accumulated elapsed time "t" decreases to a value less than the reference time (=one hour).

Figure 7:
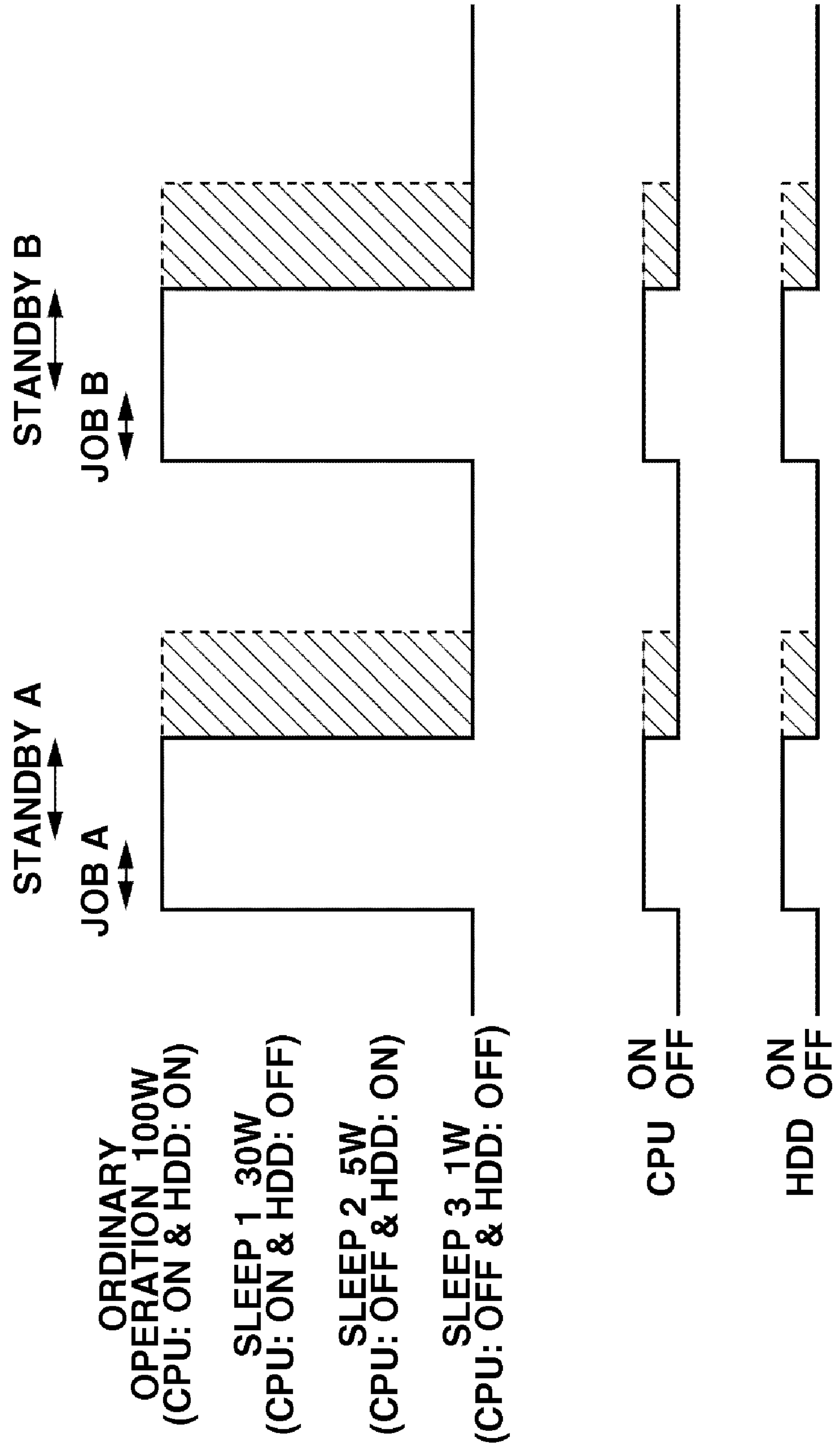
FIG. 7 illustrates an example of transitional states of a CPU and an HDD in their ON/OFF operations in comparison with a transitional state of a power supply operation according to the first exemplary embodiment.

FIG. 7 illustrates an example of transitional states of the CPU 301 and the HDD 304 in their ON/OFF operations in comparison with a transitional state of a power supply operation according to the first exemplary embodiment. In FIG. 7, a hatched region indicates the amount of electric power that can be reduced compared to that in a conventional case (see, e.g., FIG. 14). A job "A" is a job that may involve, and may even require, activation of the HDD 304. A job "B" is a job that does not involve (i.e., does not require) activation of the HDD 304.

As described above, an information processing apparatus according to the first exemplary embodiment can appropriately control the electric power supplied to a storage unit based on a reference time and an elapsed time. Accordingly, aspects of the present invention may provide an information processing apparatus and a method for controlling the information processing apparatus, which can appropriately control power supply to a storage unit based on a reference time and an elapsed time. The first exemplary embodiment takes a power ON time of an HDD into consideration to determine whether to execute the processing for stopping electric power supplied to the HDD. Therefore, the first exemplary embodiment may be capable of easily stopping the electric power supplied to the HDD.

A block diagram illustrating a configuration of a system according to a second exemplary embodiment is similar to that of the above-described first exemplary embodiment illustrated in FIG. 1, therefore its description is not repeated. A block diagram illustrating a configuration of the printer 102 according to the second exemplary embodiment is similar to that of the first exemplary embodiment illustrated in FIG. 2, therefore its description is not repeated.

Figure 8:
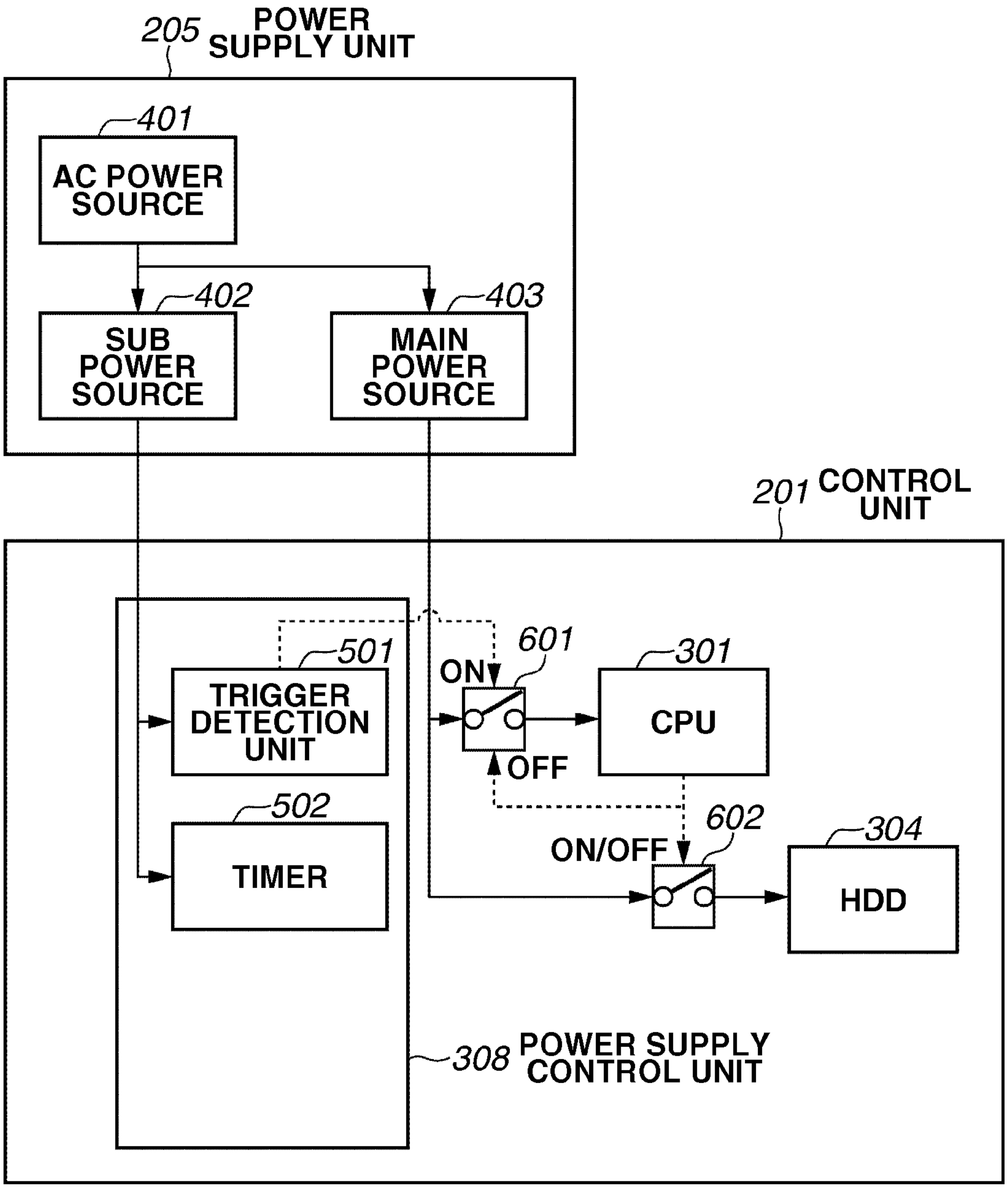
FIG. 8 is a circuit diagram illustrating a state of electric power supplied to constituent components of a power source unit and a configuration of power supply control for constituent components of a CPU and a power supply control unit according to a second exemplary embodiment.

A block diagram illustrating a configuration of the control unit 201 according to the second exemplary embodiment is similar to that of the first exemplary embodiment illustrated in FIG. 3, therefore its description is not repeated. FIG. 8 is a circuit diagram illustrating a state of electric power supplied to constituent components of the power source unit 205 and a configuration of power supply control for constituent components of the CPU 301 and the power supply control unit 308 according to the second exemplary embodiment.

The circuit diagram illustrated in FIG. 8 is different from that of the first exemplary embodiment (illustrated in FIG. 4) in that an additional ON/OFF switching unit 602 is provided. Under the control of the CPU 301, the ON/OFF switching unit 602 can perform ON/OFF control of electric power supplied to the HDD 304.

A flowchart illustrating overall control of the printer 102 according to the second exemplary embodiment is fundamentally similar to that of the first exemplary embodiment illustrated in FIG. 5 and includes the following control contents.

Example control processing according to the second exemplary embodiment is described below with reference to FIG. 5. In step S102 and step S111, the CPU 301 determines whether there is any input job that involves activation of the HDD 304.

Figure 9:
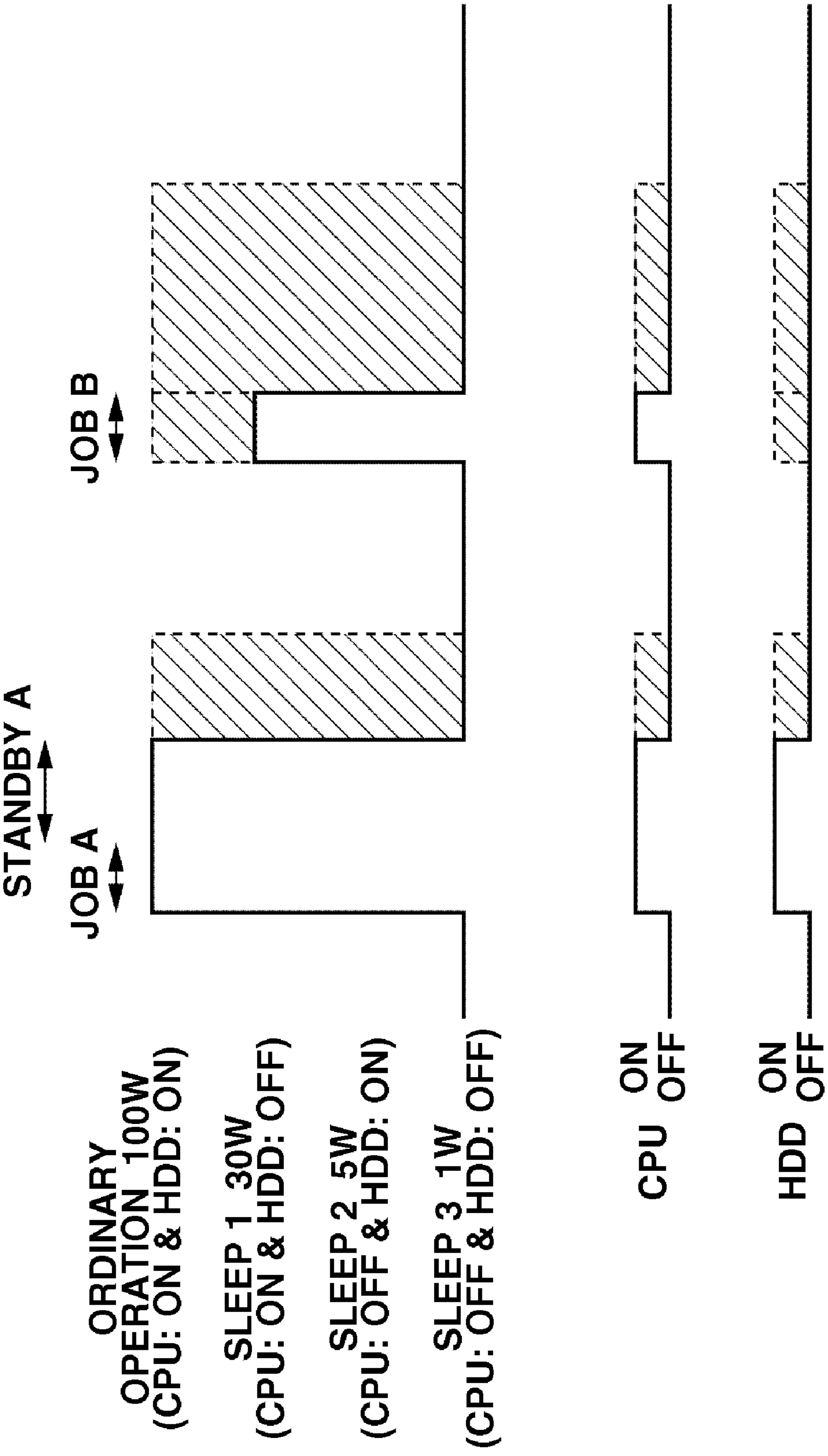
FIG. 9 illustrates an example of transitional states of a CPU and an HDD in their ON/OFF operations in comparison with a transitional state of a power supply operation according to the second exemplary embodiment.

In step S103, the CPU 301 executes the ON control for the ON/OFF switching unit 602 to start supplying electric power to the HDD 304. In step S106, the CPU 301 executes the OFF control for the ON/OFF switching unit 602 to stop the electric power supplied to the HDD 304. FIG. 9 illustrates an example of transitional states of the CPU 301 and the HDD 304 in their ON/OFF operations in comparison with a transitional state of a power supply operation according to the second exemplary embodiment.

Figure 14:
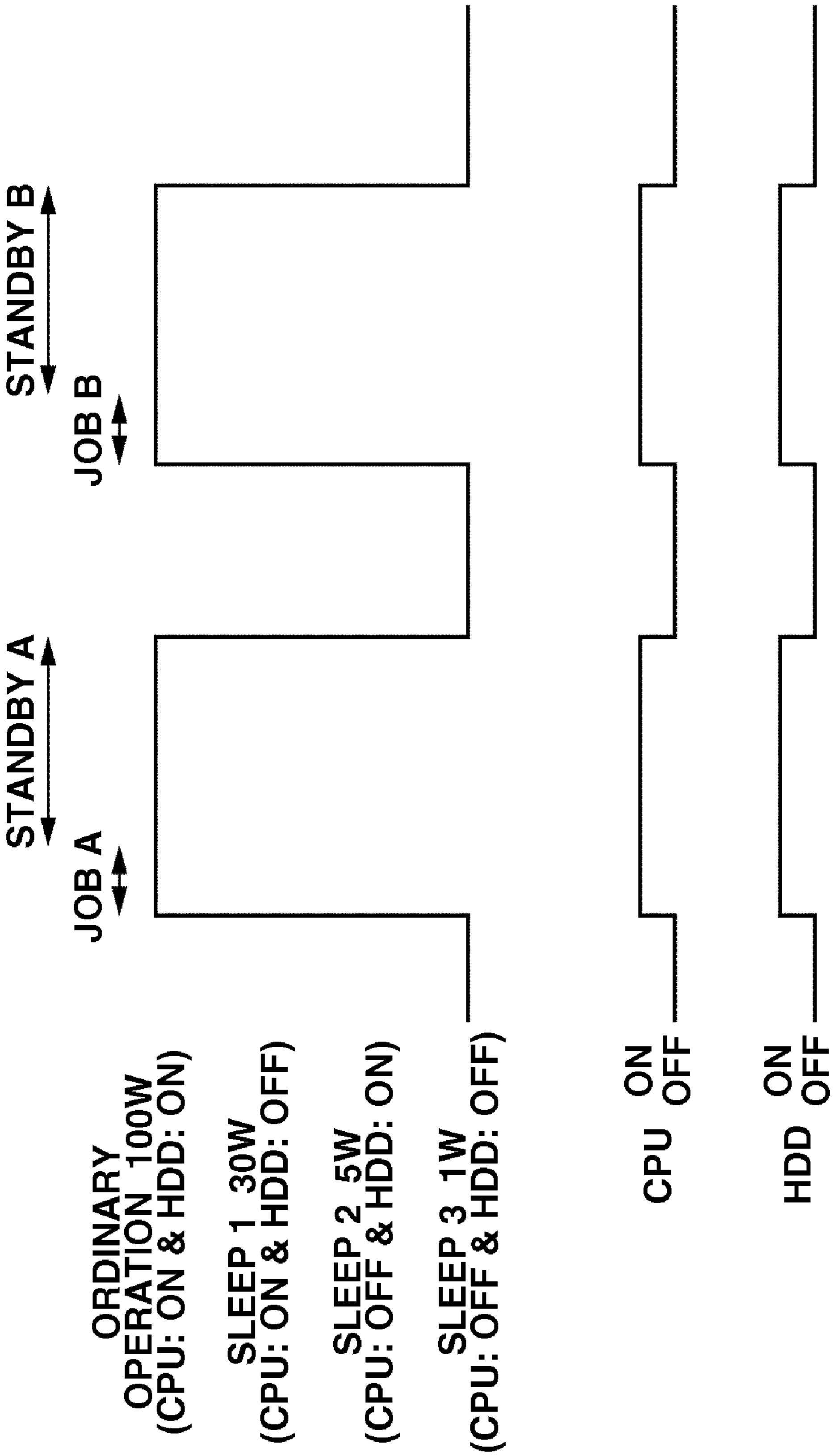
FIG. 14 illustrates an example of transitional states of a CPU and an HDD in their ON/OFF operations in comparison with a transitional state of a power supply operation according to a conventional exemplary embodiment.

In FIG. 9, a hatched region indicates the amount of electric power that can be reduced compared to that in a conventional case (see, e.g., FIG. 14). The job "A" is a job that may involve, and even require, activation of the HDD 304. The job "B" is a job that does not involve (i.e., does not require) activation of the HDD 304.

As described above, an information processing apparatus according to the second exemplary embodiment can appropriately control the electric power supplied to a storage unit based on a reference time and an elapsed time. The second exemplary embodiment takes a power ON time of an HDD into consideration to determine whether to execute the processing for stopping electric power supplied to the HDD. Therefore, the second exemplary embodiment may be capable of easily stopping the electric power supplied to the HDD.

If a job entered in a state where no electric power is supplied to the HDD 304 does not involve activation of the HDD, the second exemplary embodiment can execute job processing without activating the HDD 304. Therefore, the second exemplary embodiment may be able to reduce a great amount of electric power consumption.

A block diagram illustrating a configuration of a system according to a third exemplary embodiment is similar to that of the above-described first exemplary embodiment illustrated in FIG. 1, therefore its description is not repeated. A block diagram illustrating a configuration of the printer 102 according to the third exemplary embodiment is similar to that of the first exemplary embodiment illustrated in FIG. 2, therefore its description is not repeated.

Figure 10:
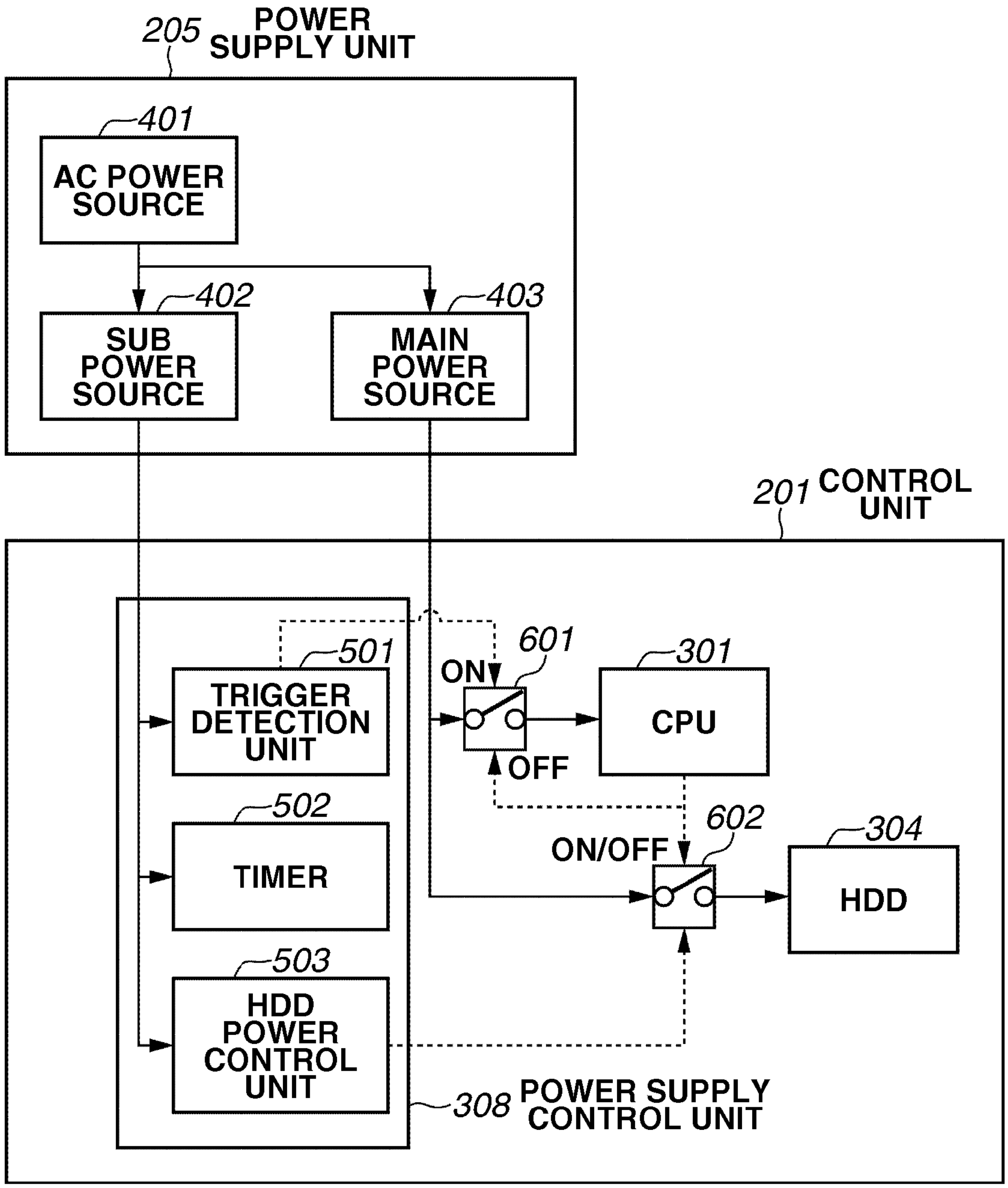
FIG. 10 is a circuit diagram illustrating a state of electric power supplied to constituent components of a power source unit and a configuration of power supply control for constituent components of a CPU and a power supply control unit according to a third exemplary embodiment.

A block diagram illustrating a configuration of the control unit 201 according to the third exemplary embodiment is similar to the configuration of the first exemplary embodiment illustrated in FIG. 3 and its description is not provided below. FIG. 10 is a circuit diagram illustrating a state of electric power supplied to constituent components of the power source unit 205 and a configuration of power supply control for constituent components of the CPU 301 and the power supply control unit 308 according to the third exemplary embodiment.

The circuit diagram illustrated in FIG. 10 is different from that of the first exemplary embodiment (illustrated in FIG. 4) in that an HDD power control unit 503 and the ON/OFF switching unit 602 are additionally provided. Under the control of the HDD power control unit 503, the ON/OFF switching unit 602 can perform ON/OFF control of electric power supplied to the HDD 304. A flowchart illustrating overall control of the printer 102 according to the third exemplary embodiment is fundamentally similar to that of the first exemplary embodiment illustrated in FIG. 5, however, includes the following control contents.

Example control processing according to the third exemplary embodiment is described below with reference to FIG. 5. In step S103, the trigger detection unit 501 executes the ON control for the ON/OFF switching unit 601 immediately before executing the job processing. The CPU 301 executes the OFF control for the ON/OFF switching unit 601 immediately after completing the job processing.

Figure 11:
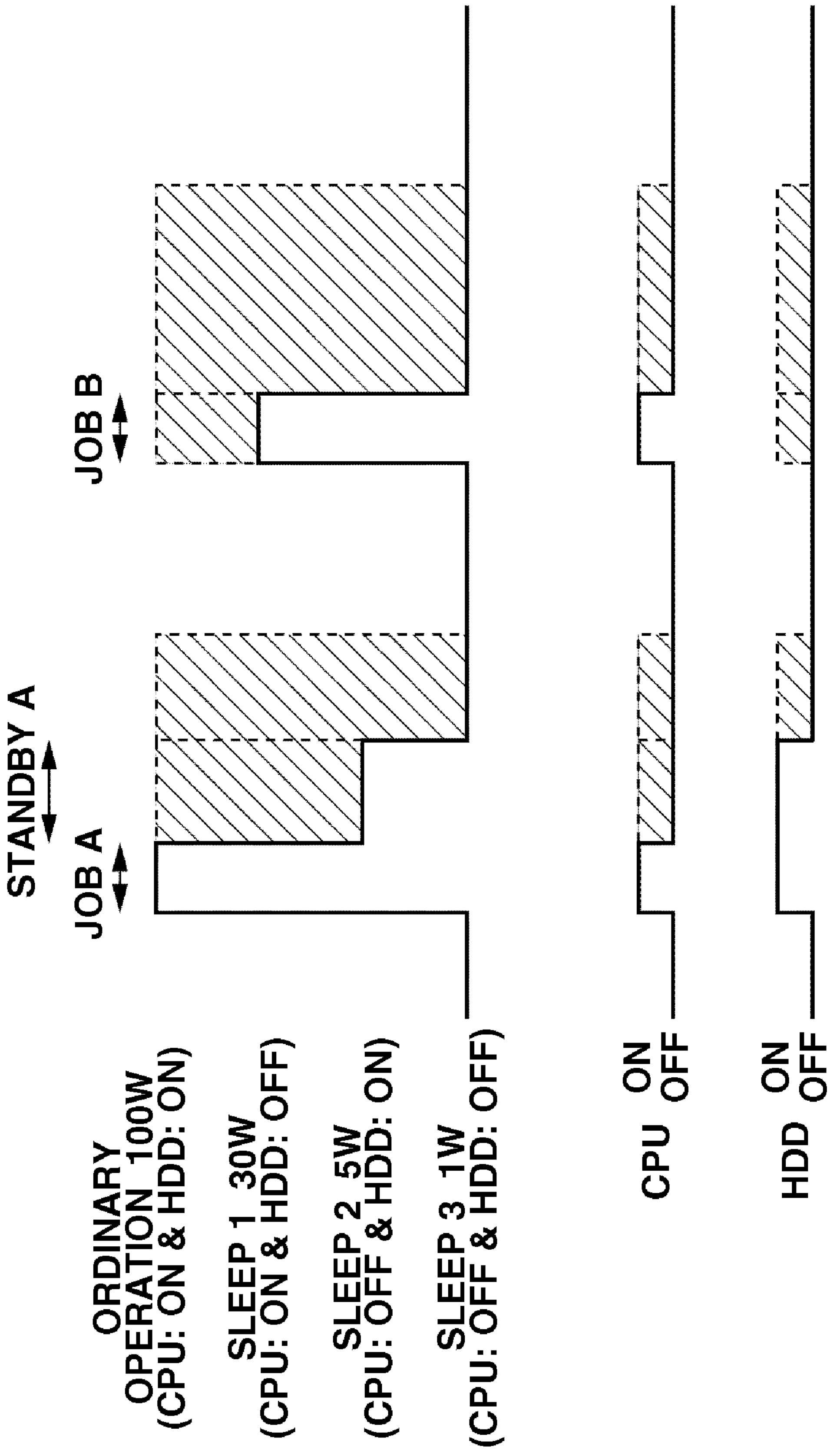
FIG. 11 illustrates an example of transitional states of a CPU and an HDD in their ON/OFF operations in comparison with a transitional state of a power supply operation according to the third exemplary embodiment.

The HDD power control unit 503 can execute the processing of steps S102 to S103 and steps S105 to S112. Namely, in the present exemplary embodiment, the CPU 301 may not execute the processing of steps S102 to S103 and steps S105 to S112. FIG. 11 illustrates examples of transitional states of the CPU 301 and the HDD 304 in their ON/OFF operations in comparison with a transitional state of a power supply operation according to the third exemplary embodiment. In FIG. 11, a hatched region indicates the amount of electric power that can be reduced compared to that in a conventional case (see, e.g., FIG. 14). The job "A" is a job that may involve, and even require activation of the HDD 304. The job "B" is a job that does not involve (i.e., does not require) activation of the HDD 304.

As described above, an information processing apparatus according to the third exemplary embodiment can appropriately control the electric power supplied to a storage unit based on a reference time and an elapsed time. The third exemplary embodiment takes a power ON time of an HDD into consideration to determine whether to execute the processing to stop the electric power supplied to the HDD. Therefore, the third exemplary embodiment may be able to easily stop the electric power supplied to the HDD.

The third exemplary embodiment can stop the electric power supplied to the CPU 301 if job processing is not performed. Therefore, the third exemplary embodiment may be capable of further reducing electric power consumption.

A block diagram illustrating a configuration of a system according to a fourth exemplary embodiment is similar to the configuration of the first exemplary embodiment illustrated in FIG. 1, and thus its description is not repeated. A block diagram illustrating a configuration of the printer 102 according to the fourth exemplary embodiment is similar to the configuration of the first exemplary embodiment illustrated in FIG. 2, and thus its description is not repeated. A block diagram illustrating a configuration of the control unit 201 according to the fourth exemplary embodiment is similar to the configuration of the first exemplary embodiment illustrated in FIG. 3, and thus its description is not repeated.

Figure 12:
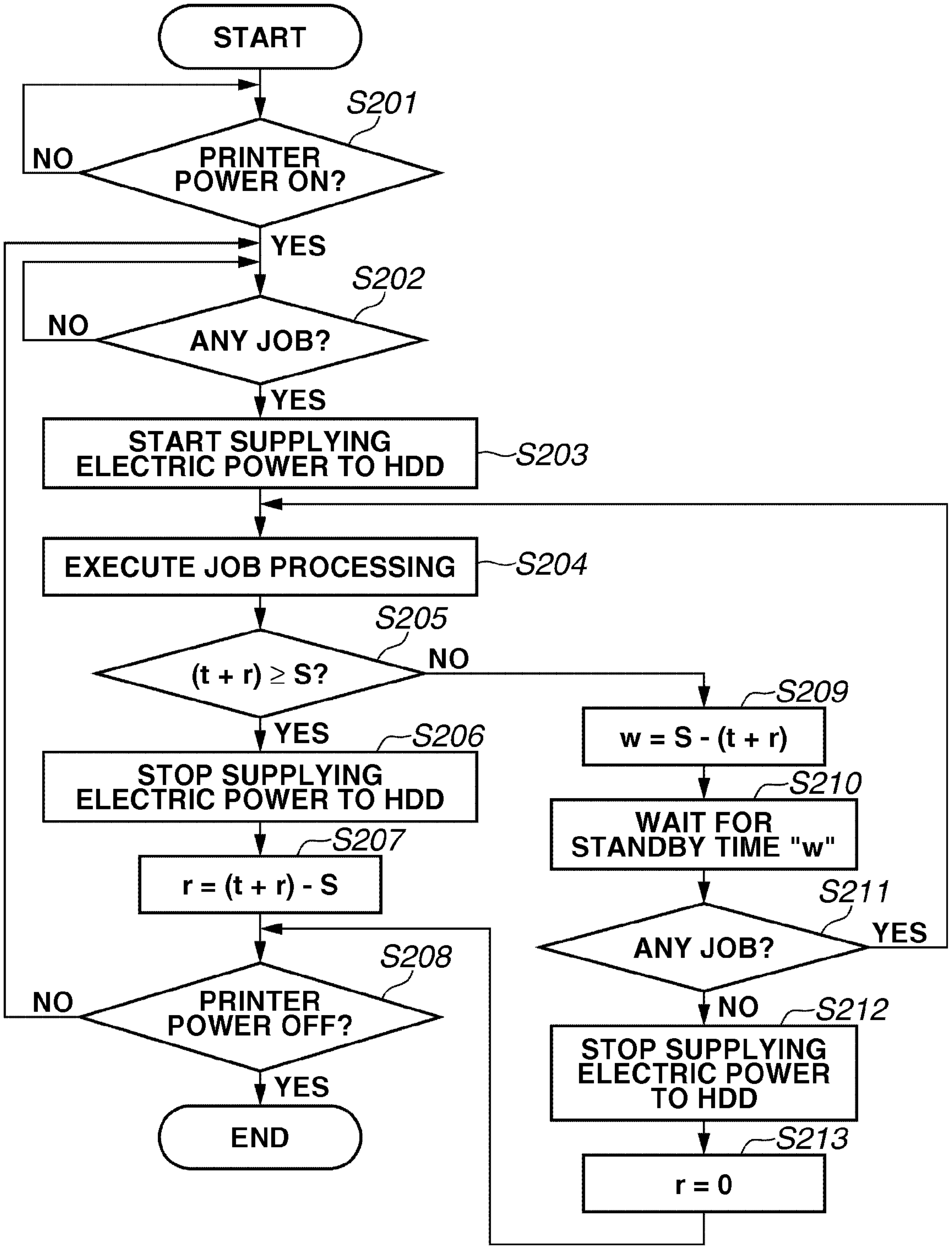
FIG. 12 is a flowchart illustrating example control that can be performed by the printer according to a fourth exemplary embodiment.

A circuit diagram illustrating a state of electric power supplied to constituent components of the power source unit 205 and a configuration of power supply control for constituent components of the CPU 301 and the power supply control unit 308 according to the fourth exemplary embodiment may be similar to the circuit diagram of the first exemplary embodiment illustrated in FIG. 4, and therefore its description is not repeated. FIG. 12 is a flowchart illustrating example control that can be performed by the printer 102 according to the fourth exemplary embodiment. In one version, to execute the control processing of the flowchart illustrated in FIG. 12, the CPU 301 reads and executes a program loaded into the RAM 303 from the HDD 304.

In step S201, the CPU 301 determines whether the power source of the printer 102 is turned on. If in step S201 the CPU 301 determines that the power source of the printer 102 is in an ON state (YES in step S201), the processing proceeds to step S202. If it is determined that the power source of the printer 102 is in an OFF state (NO in step S201), then step S201 is repeated. When the processing proceeds to step S202, the timer 502 starts measuring the elapsed time "t."

In step S202, the CPU 301 determines whether there is any input job. The trigger detection unit 501 detects a trigger of the input job. If in step S202 the CPU 301 determines that an input job is present (YES in step S202), then processing proceeds to step S203, where the trigger detection unit 501 performs the ON control for the ON/OFF switching unit 601 to start supplying electric power to the HDD 304. If the CPU determines that there is no input job present (NO in step S202), then step S202 is repeated. In step S204, the CPU 301 executes job processing. More specifically, to perform the job processing, the CPU 301 controls a constituent component of the printer 102, which may be used to process a job (i.e., a processing object), according to a job type. If the processing of step S204 is completed and there is not any job to be next processed, the CPU 301 determines that the present state satisfies a condition for stopping electric power supplied from the power source unit 205 to the HDD 304 via the ON/OFF switching unit 601. The processing proceeds to step S205.

In step S205, the CPU 301 determines whether a sum of the elapsed time "t" and a storage time "r" is equal to or greater than a reference time "S." In other words, the CPU 301 determines whether to stop the electric power supplied to the HDD 304 based on a comparison result. The elapsed time "t" is a time that can be measured by the timer 502 until the processing proceeds to step S205. The storage time "r" is a value that can be calculated in the previous step S207 of the loop processing including steps S202 to S208.

The reference time "S" represents a standby time for the HDD 304, which is generally a fixed value. The reference time "S" is a time that can be referred to by the CPU 301 to determine whether to stop the electric power supplied to the HDD 304. When "P" represents the product lifetime of the printer 102 and "H" represents the number of ON/OFF times that can be assured for the HDD 304, a formula S=P/H may define the reference time "S." The reference time "S" can be stored in the HDD 304 and can optionally be loaded into the RAM 303. The printer 102 may calculate the reference time "S." The HDD 304 may store the reference time "S" beforehand. If in step S205 the CPU 301 determines that the sum of the elapsed time "t" and the storage time "r" is equal to or greater than the reference time "S" (YES in step S205), the processing proceeds to step S206. If in step S205 the CPU 301 determines that the sum of the elapsed time "t" and the storage time "r" is less than the reference time "S" (NO in step S205), the processing proceeds to step S209.

In step S206, i.e., when the sum of the elapsed time "t" and the storage time "r" is equal to or greater than the reference time "S" in step S205, the CPU 301 executes the OFF control for the ON/OFF switching unit 601 to stop the electric power supplied to the HDD 304 at this timing (i.e., first timing) In step S206, the CPU 301 may wait for a predetermined time before stopping the electric power supplied to the HDD 304.

In step S207, the CPU 301 subtracts the reference time "S" from the sum of the elapsed time "t" and the storage time "r" and sets an obtained value as a new storage time "r." After completing the processing of step S207, the timer 502 resets the elapsed time "t" to 0.

In step S208, the CPU 301 determines whether the power source of the printer 102 is turned off. If in step S208 the CPU 301 determines that the power source of the printer 102 is in an OFF state, the CPU 301 terminates the processing of the routine illustrated in FIG. 12. When the power source of the printer 102 is turned off, the timer 502 terminates the measurement of the elapsed time "t." When the power source of the printer 102 is turned off (YES in step S208), the CPU 301 stores the value of the storage time "r" in the HDD 304. The CPU 301 reads the stored value of the storage time "r" from the HDD 304 when the power source of the printer 102 is turned on in the next processing of step S201. If in step S208 the CPU 301 determines that the power source of the printer 102 is in an ON state (NO in step S208), the processing returns to step S202.

In step S209, i.e., when the sum of the elapsed time "t" and the storage time "r" is less than the reference time "S" in step S205, the CPU 301 calculates a value of a predetermined standby time "w." The standby time "w" is a time set as a temporal duration from a termination of the job processing in step S204 to an initiation of HDD power supply stop processing in step S212, in a state where no job is input in the printer 102. The standby time "w" can be calculated by subtracting the sum of the elapsed time "t" and the storage time "r" from the reference time "S". Then, in step S210, the CPU 301 waits for a predetermined time that is equivalent to the standby time "w" calculated in step S209, while continuously supplying electric power to the HDD 304.

In step S211, the CPU 301 determines whether any job is input in the standby state of step S210. If in step S211 the CPU 301 determines that an input job is present (YES in step S211), the processing returns to step S204. If in step S211 the CPU 301 determines that there is not any input job (NO in step S211), the processing proceeds to step S212. In step S212, the CPU 301 executes the OFF control for the ON/OFF switching unit 601 to stop the electric power supplied to the HDD 304 at this timing (i.e., second timing). In step S213, the CPU 301 resets the storage time "r" to 0. After completing the processing of step S213, the timer 502 resets the elapsed time "t" to 0. Then, the processing proceeds to step S208.

In the above-described processing, when the sum of the elapsed time "t" and the storage time "r" is equal to or greater than the reference time "S", the CPU 301 executes processing for stopping electric power supplied to the HDD 304. Alternatively, the CPU 301 can execute any other equivalent determination. For example, if the elapsed time "t" is equal to or greater than a value that can be obtained by subtracting the storage time "r" from the reference time "S", the CPU 301 may determine to stop the electric power supplied to the HDD 304. For example, if the storage time "r" is equal to or greater than a value that can be obtained by subtracting the elapsed time "t" from the reference time "S", the CPU 301 may determine to stop the electric power supplied to the HDD 304.

In the above-described processing in step S206 or step S212, the CPU 301 stops supplying electric power to the HDD 304. Alternatively, the CPU 301 can reduce the amount of electric power supplied to the HDD 304. For example, as a method for reducing the electric power supplied to the HDD 304, it is possible to stop the electric power supplied to a motor that is configured to rotate a disk of the HDD 304. In this state, the CPU 301 cannot read and write data from and to the HDD 304.

As described above, an information processing apparatus according to the fourth exemplary embodiment can appropriately control the electric power supplied to a storage unit based on a reference time and an elapsed time. The fourth exemplary embodiment takes a power ON time of an HDD into consideration to determine whether to execute the processing for stopping electric power supplied to the HDD. Therefore, the fourth exemplary embodiment may be capable of easily stopping the electric power supplied to the HDD.

A block diagram illustrating a configuration of a system according to a fifth exemplary embodiment is similar to the configuration of the first exemplary embodiment illustrated in FIG. 1, and thus its description is not repeated. A block diagram illustrating a configuration of the printer 102 according to the fifth exemplary embodiment is similar to the configuration of the first exemplary embodiment illustrated in FIG. 2, and thus its description is not repeated. A block diagram illustrating a configuration of the control unit 201 according to the fifth exemplary embodiment is similar to the configuration of the first exemplary embodiment illustrated in FIG. 3, and thus its description is not repeated.

Figure 13:
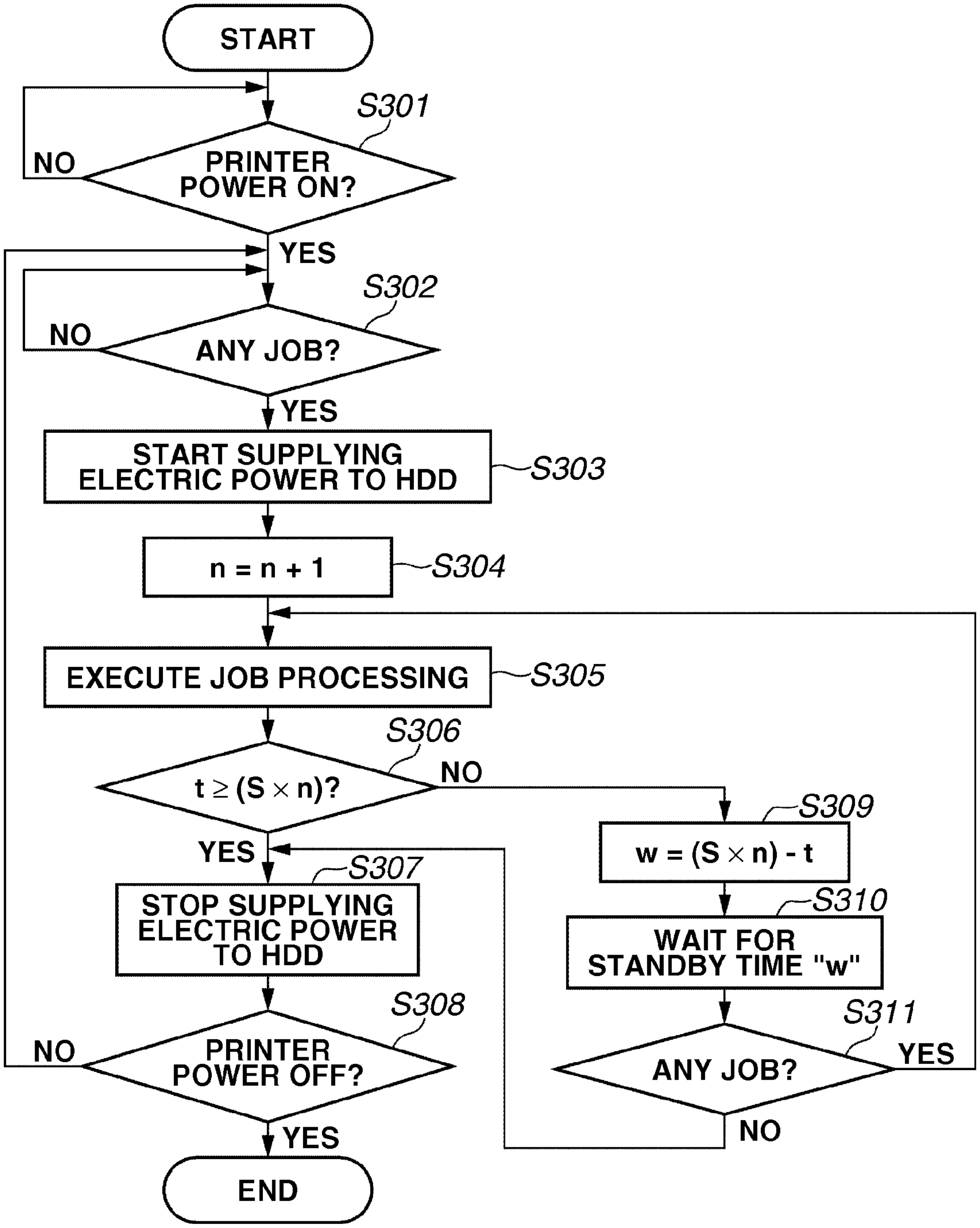
FIG. 13 is a flowchart illustrating example control that can be performed by the printer according to a fifth exemplary embodiment.

A circuit diagram illustrating a state of electric power supplied to constituent components of the power source unit 205 and a configuration of power supply control for constituent components of the CPU 301 and the power supply control unit 308 according to the fifth exemplary embodiment is similar to the circuit diagram of the first exemplary embodiment illustrated in FIG. 4, and thus its description is not repeated. FIG. 13 is a flowchart illustrating example control that can be performed by the printer 102 according to the fifth exemplary embodiment. In one version, to execute the control processing of the flowchart illustrated in FIG. 13, the CPU 301 reads and executes a program loaded into the RAM 303 from the HDD 304.

In step S301, the CPU 301 determines whether the power source of the printer 102 is turned on. If in step S301 the CPU 301 determines that the power source of the printer 102 is in an ON state (YES in step S301), the processing proceeds to step S302. If it is determined that the power source of the printer 102 is in an OFF state (NO in step S301), then step S301 is repeated. When the processing proceeds to step S302, the timer 502 starts measuring the elapsed time "t."

In step S302, the CPU 301 determines whether there is any input job. The trigger detection unit 501 detects a trigger of the input job. If in step S302 the CPU 301 determines that an input job is present (YES in step S302), then processing proceeds to step S303, where the CPU 301 performs the ON control for the ON/OFF switching unit 601 to start supplying electric power to the HDD 304. If it is determined that no input job is present (NO in step S302), then step S302 is repeated. In step S304, the CPU 301 increments a number "n" of times of the start operation, which indicates the number of times of the operation for starting supplying electric power to the HDD in step S303. The number "n" of times of the start operation may be recorded in the HDD 304 and can optionally be loaded into the RAM 303. In step S305, the CPU 301 executes job processing.

More specifically, to perform the job processing, the CPU 301 controls a constituent component of the printer 102, which may be used to process a job (i.e., a processing object), according to a job type. If the processing of step S305 is completed and there is not any job to be next processed, the CPU 301 determines that the present state satisfies a condition for stopping electric power supplied from the power source unit 205 to the HDD 304 via the ON/OFF switching unit 601. The processing proceeds to step S306.

In step S306, the CPU 301 determines whether the elapsed time "t" is equal to or greater than a value obtained by multiplying the reference time "S" by the number "n" of times of the start operation. In other words, the CPU 301 determines whether to stop the electric power supplied to the HDD 304 based on a comparison result. The elapsed time "t" is a time that can be measured by the timer 502 until the processing proceeds to step S305.

The reference time "S" represents a standby time for the HDD 304, which is generally a fixed value. The reference time "S" is a time that can be referred to by the CPU 301 to determine whether to stop the electric power supplied to the HDD 304. When "P" represents the product lifetime of the printer 102 and "H" represents the number of ON/OFF times that can be assured for the HDD 304, a formula S=P/H may define the reference time "S." The reference time "S" can be stored in the HDD 304 and can optionally be loaded into the RAM 303. The printer 102 may calculate the reference time "S." The HDD 304 may store the reference time "S" beforehand.

If in step S306 the CPU 301 determines that the elapsed time "t" is equal to or greater than the value obtained by multiplying the reference time "S" by the number "n" of times of the start operation (YES in step S306), the processing proceeds to step S307. If in step S306 the CPU 301 determines that the elapsed time "t" is less than the value obtained by multiplying the reference time "S" by the number "n" of times of the start operation (NO in step S306), the processing proceeds to step S309.

In step S307, i.e., if in step S306 it is determined the elapsed time "t" is equal to or greater than the value obtained by multiplying the reference time "S" by the number "n" of times of the start operation, the CPU 301 promptly executes the OFF control for the ON/OFF switching unit 601 to stop the electric power supplied to the HDD 304 at this timing. In step S307, the CPU 301 may also wait for a predetermined time before stopping the electric power supplied to the HDD 304.

In step S308, the CPU 301 determines whether the power source of the printer 102 is turned off. If in step S308 the CPU 301 determines that the power source of the printer 102 is in an OFF state, the CPU 301 terminates the processing of the routine illustrated in FIG. 13. When the power source of the printer 102 is turned off, the timer 502 terminates the measurement of the elapsed time "t." When the power source of the printer 102 is turned off (YES in step S308), the CPU 301 stores the value of the elapsed time "t" in the HDD 304. The CPU 301 reads the stored value of the elapsed time "t" from the HDD 304 when the power source of the printer 102 is turned on in the next processing of step S301. If in step S308 the CPU 301 determines that the power source of the printer 102 is in an ON state (NO in step S308), the processing returns to step S302.

In step S309, i.e., if in step S306 it is determined that the elapsed time "t" is less than the value obtained by multiplying the reference time "S" by the number "n" of times of the start operation, the CPU 301 calculates a value of the predetermined standby time "w." The standby time "w" is a time set as a temporal duration from a termination of the job processing in step S305 to an initiation of HDD power supply stop processing in step S307, in a state where no job is input in the printer 102.

The standby time "w" can be calculated by subtracting the elapsed time "t" from the value obtained by multiplying the reference time "S" by the number "n" of times of the start operation. Then, in step S310, the CPU 301 waits for a predetermined time that is equivalent to the standby time "w" calculated in step S309, while continuously supplying electric power to the HDD 304. In step S311, the CPU 301 determines whether any job is input in the standby state of step S310. If in step S311 the CPU 301 determines that an input job is present (YES in step S311), the processing returns to step S305. If in step S311 the CPU 301 determines that there is not any input job (NO in step S311), the processing proceeds to step S307.

In the above-described processing, when the elapsed time "t" is equal to or greater than the value obtained by multiplying the reference time "S" by the number "n" of times of the start operation, the CPU 301 executes processing for stopping electric power supplied to the HDD 304.

Alternatively, the CPU 301 may execute other determinations, which may be equivalent determinations. For example, if the reference time "S" is less than a value obtained by dividing the elapsed time "t" by the number "n" of times of the start operation, the CPU 301 may determine to stop the electric power supplied to the HDD 304. For example, if the number "n" of times of the start operation is less than a value obtained by dividing the elapsed time "t" by the reference time "S", the CPU 301 may determine to stop the electric power supplied to the HDD 304.

In the above-described processing in step S307, the CPU 301 stops supplying electric power to the HDD 304. Alternatively, the CPU 301 can reduce the amount of electric power supplied to the HDD 304. For example, as a method for reducing the electric power supplied to the HDD 304, it is possible to stop the electric power supplied to a motor that is configured to rotate a disk of the HDD 304. In this state, the CPU 301 cannot read and write data from and to the HDD 304.

The above-described exemplary embodiment executes the control for turning off the power source of the HDD 304 based on the number of times of the starting (or increasing) operation for starting (or increasing) the electric power supply to the HDD 304. However, the control for turning off the power source of the HDD 304 can be performed based on the number of times of the stopping (or decreasing) operation for stopping (or decreasing) the electric power supply to the HDD 304.

In this case, the CPU 301 increments the number "n" of times of the stop operation when the CPU 301 stops the electric power supply to the HDD 304 in step S307. In this case, the control for turning off the power source of the HDD 304 may be performed by determining whether to stop supplying electric power to the HDD 304 based on a determination result of step S306, in which it is determined whether the elapsed time "t" is equal to or greater than a value obtained by adding one to the number "n" of times of the stop operation and then multiplying an obtained sum by the reference time "S."

As described above, an information processing apparatus according to the fifth exemplary embodiment may be able to appropriately control the electric power supplied to a storage unit based on a reference time and an elapsed time. The fifth exemplary embodiment takes a power ON time of an HDD into consideration to determine whether to execute the processing for stopping electric power supplied to the HDD. Therefore, the fifth exemplary embodiment may be capable of easily stopping the electric power supplied to the HDD.

A block diagram illustrating a configuration of a system according to a sixth exemplary embodiment is similar to the configuration of the first exemplary embodiment illustrated in FIG. 1, and thus its description is not repeated. A block diagram illustrating a configuration of the printer 102 according to the sixth exemplary embodiment is similar to the configuration of the first exemplary embodiment illustrated in FIG. 2, and thus its description is not repeated. A block diagram illustrating a configuration of the control unit 201 according to the sixth exemplary embodiment is similar to the configuration of the first exemplary embodiment illustrated in FIG. 3, and thus its description is not repeated.

A circuit diagram illustrating a state of electric power supplied to constituent components of the power source unit 205 and a configuration of power supply control for constituent components of the CPU 301 and the power supply control unit 308 according to the sixth exemplary embodiment is similar to the circuit diagram of the first exemplary embodiment illustrated in FIG. 4.

Figure 15:
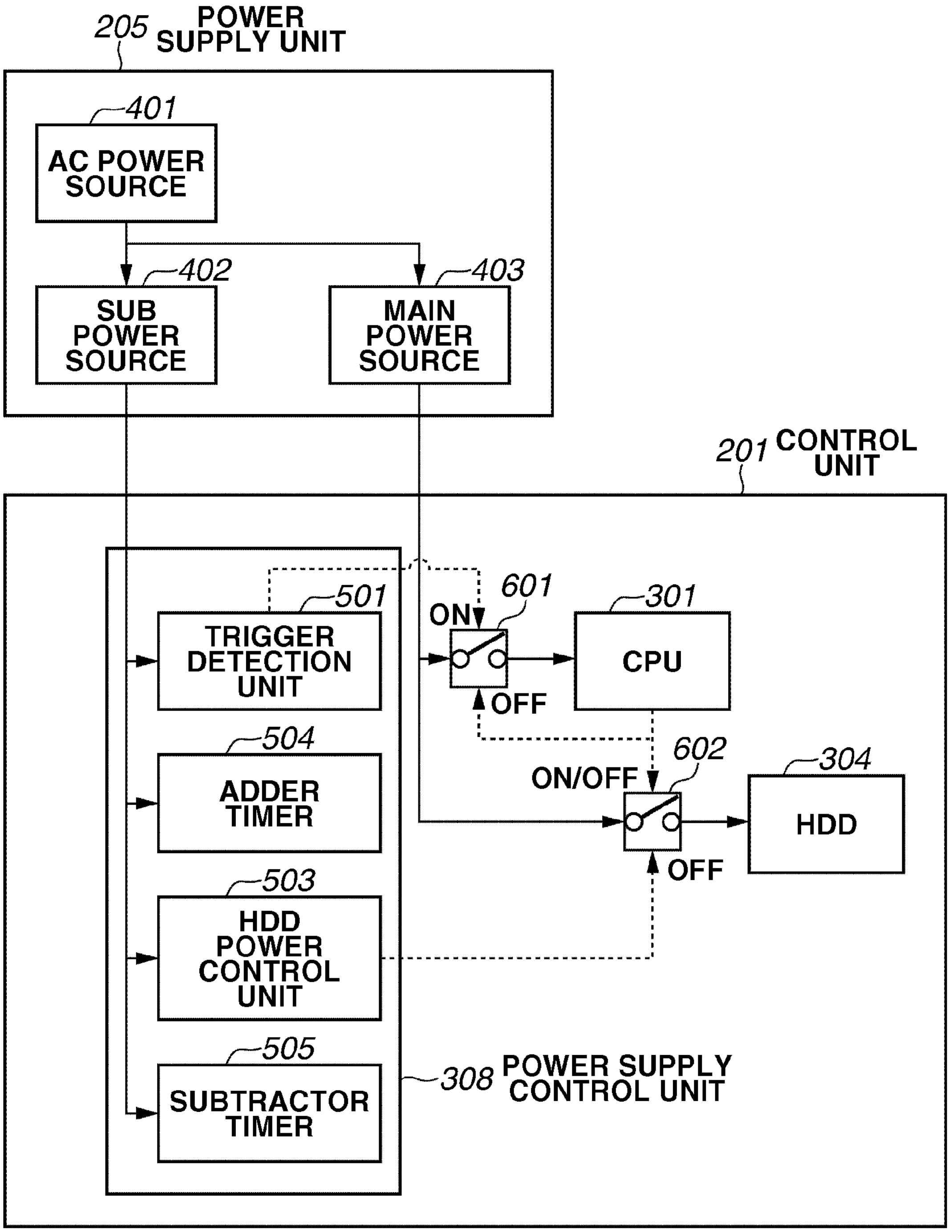
FIG. 15 is a circuit diagram illustrating a state of electric power supplied to constituent components of a power source unit and a configuration of power supply control for constituent components of a CPU and a power supply control unit according to a sixth exemplary embodiment.

FIG. 15 is a circuit diagram illustrating a state of electric power supplied to constituent components of the power source unit 205 and a configuration of power supply control for constituent components of the CPU 301 and the power supply control unit 308 according to the sixth exemplary embodiment. The circuit diagram illustrated in FIG. 15 is different from that of the first exemplary embodiment (illustrated in FIG. 4) in that the HDD power control unit 503 and the ON/OFF switching unit 602 are additionally provided. Under the control of the CPU 301 and the ON/OFF switching unit 602, the ON/OFF switching unit 602 can execute ON/OFF control of electric power supplied to the HDD 304.

The circuit diagram illustrated in FIG. 15 is further different from that of the first exemplary embodiment (illustrated in FIG. 4) in that the timer 502 is replaced with a combination of an adder timer 504 and a subtractor timer 505. Operations of the adder timer 504 and the subtractor timer 505 are described below with reference to a flowchart of FIG. 16. The adder timer 504 and the subtractor timer 505 can be, for example, constituted by a real-time clock (e.g., a calendar IC) or a system timer of the OS.

Figure 16:
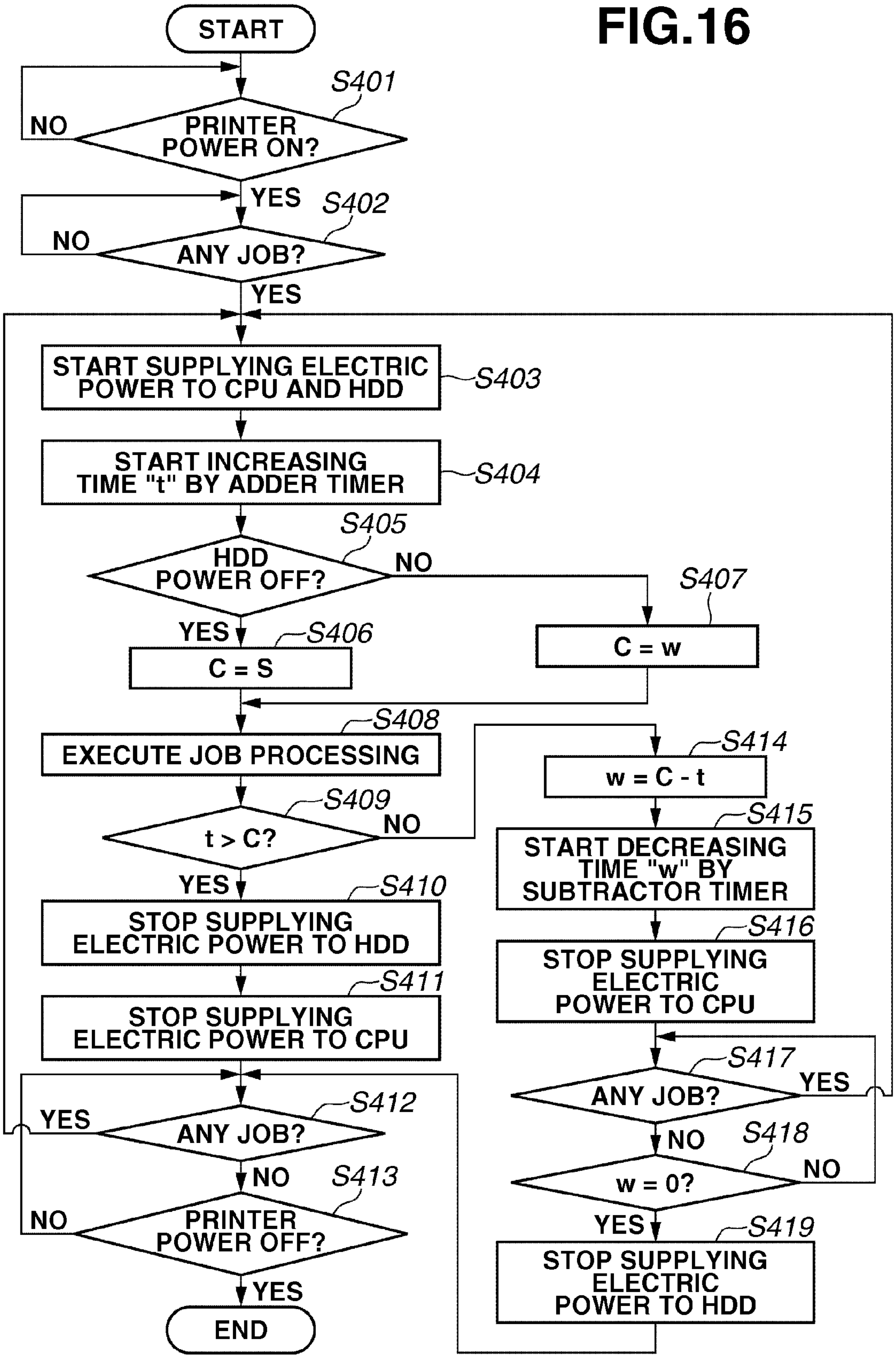
FIG. 16 is a flowchart illustrating example control that can be performed by the printer according to the sixth exemplary embodiment.

The trigger detection unit 501 can detect a state of the ON/OFF switching unit 602 via the HDD power control unit 503 and can determine whether the electric power supply to the HDD 304 is stopped based on a detected state. FIG. 16 is a flowchart illustrating example control that can be performed by the printer 102 according to the sixth exemplary embodiment. In one version, to execute the control processing of the flowchart illustrated in FIG. 16, the CPU 301 reads and executes a program loaded into the RAM 303 from the HDD 304.

In the present exemplary embodiment, the job includes a reading job performed by the reading unit 203, a print job performed by the printing unit 204, an operation response job performed by the operation unit 202, and a network response job performed by the network IF 307.

In the present exemplary embodiment, the operation modes of the printer 102 include a normal mode and a power saving mode. In the normal mode, the power source of the CPU 301 and the HDD 304 is turned on (i.e., electric power is supplied to the CPU 301 and the HDD 304). In the power saving mode (i.e., in a power saving state), the power source of one or more of the CPU 301 or the HDD 304 is turned off (i.e., electric power is not supplied to both of the CPU 301 or the HDD 304). The power saving mode (i.e., the power saving state) includes a first power saving mode (i.e., a first power saving state) in which only the power source of the CPU 301 is turned off and a second power saving mode (i.e., a second power saving state) in which the electric power supply to both the CPU 301 and the HDD 304 is stopped.

In step S401, the CPU 301 determines whether the power source of the printer 102 is turned on. If in step S401 it is determined that the power source of the printer 102 is in an ON state (YES in step S401), the processing proceeds to step S402. If it is determined that the power source of the printer is in an OFF state (NO in step S401), the step S401 is repeated. In step S402, the CPU 301 determines whether there is any input job. The trigger detection unit 501 detects a trigger of the input job. If in step S402 it is determined that an input job is present (YES in step S402), the processing proceeds to step S403. If it is determined that there is no input job present (NO in step S402), then step S402 is repeated.

In step S403, the CPU 301 starts supplying electric power to the CPU 301 and the HDD 304. Before the CPU 301 executes the processing of step S403, the trigger detection unit 501 detects whether the electric power supply to the HDD 304 is stopped. The trigger detection unit 501 stores the information in its built-in memory. When the processing returns from step S417 to step S403, the electric power supply to the HDD 304 is already started and therefore the CPU 301 starts supplying electric power to the CPU 301 in step S403.

In step S404, the CPU 301 causes the adder timer 504 to increment the time "t" that indicates the power ON time of the CPU 301. In the processing of step S404, the adder timer 504 resets the time "t" to 0 every time before starting incrementing the time "t."

In step S405, the CPU 301 determines whether the electric power supply to the HDD 304 has been stopped at the time when the processing proceeds to step S403. The determination of step S405 is performed based on the information stored in the built-in memory of the trigger detection unit 501. The information indicates whether the electric power supply to the HDD 304 has been stopped before the CPU 301 performs the processing of step S403. At the time when the processing proceeds to step S403 from step S402 or step S412, the electric power supply to the HDD 304 is in a stopped state. On the other hand, at the time when the processing proceeds to step S403 from step S417, the electric power supply to the HDD 304 is not stopped.

If in step S405 it is determined that the electric power supply to the HDD 304 has been stopped at the time when the processing proceeds to step S403 (YES in step S405), the processing proceeds to step S406. If in step S405 it is determined that the electric power supply to the HDD 304 has not been stopped at the time when the processing proceeds to step S403 (NO in step S405), the processing proceeds to step S407.

In step S406, i.e., if in step S405 it is determined that the electric power supply to the HDD 304 has been stopped at the time when the processing proceeds to step S403, the CPU 301 sets the reference time "S" as a value C (i.e., a comparison object in the determination of step S409). Processing then proceeds to step S408.

In step S407, i.e., if in step S405 it is determined that the electric power supply to the HDD 304 has not been stopped at the time when the processing proceeds to step S403, the CPU 301 sets a standby time "w" as the value C (i.e., the comparison object in the determination of step S409). The standby time "w" is a value that can be calculated in step S414 and decremented in step S415. Processing then proceeds to step S408.

In step S408, the CPU 301 executes job processing. If in step S408 there is any other job that may remain after completing the processing of one job, the CPU 301 processes the remaining job. A predetermined waiting time can be set before the processing proceeds to step S409 from step S408.

In step S409, the CPU 301 determines whether the time "t" (i.e., the value that is incremented in step S404) is greater than the value C (i.e., the value having been set in step S406 or step S407). If in step S409 it is determined that the time "t" is greater than the value C (YES in step S409), the processing proceeds to step S410. If in step S409 it is determined that the time "t" is not greater than the value C (NO in step S409), the processing proceeds to step S414.

In step S410, i.e., if in step S409 it is determined that the time "t" is greater than the value C, the CPU 301 controls the ON/OFF switching unit 602 to stop the electric power supplied to the HDD 304 at this timing (i.e., first timing). In step S411, the CPU 301 controls the ON/OFF switching unit 601 to stop the electric power supplied to the CPU 301.

In step S412, the CPU 301 causes the trigger detection unit 501 to determine whether any job is input. If in step S412 the trigger detection unit 501 detects an input job (YES in step S412), the processing returns to step S403. If in step S412 the trigger detection unit 501 does not detect any input job (NO in step S412), the processing proceeds to step S413.

In step S413, i.e., if in step S412 it is determined that there is not any input job, the CPU 301 determines whether the power source of the printer 102 is turned off. If in step S413 it is determined that the power source of the printer 102 is in an OFF state (YES in step S413), the CPU 301 terminates the processing of the routine illustrated in FIG. 16. If in step S413 it is determined that the power source of the printer 102 is in an ON state (NO in step S413), the processing returns to step S412.

In step S414, i.e., if in step S409 it is determined that the time "t" is not greater than the value C, the CPU 301 sets the standby time "w" during which the control for stopping the electric power supply to the HDD 304 is postponed. The standby time "w" is a value that can be obtained by subtracting the time "t" from the value C.

In step S415, the CPU 301 causes the subtractor timer 505 to decrement the standby time "w" obtained in step S414. In step S416, the CPU 301 controls the ON/OFF switching unit 601 to stop the electric power supplied to the CPU 301.

In step S417, the CPU 301 causes the trigger detection unit 501 to determine whether any job is input. If in step S417 the trigger detection unit 501 detects an input job (YES in step S417), the processing returns to step S403. If in step S412 the trigger detection unit 501 does not detect any input job (NO in step S417), the processing proceeds to step S418.

In step S418, i.e., if in step S417 it is determined that there is not any input job, the CPU 301 determines whether the standby time "w" decremented in step S415 is equal to 0. If in step S418 it is determined that the standby time "w" decremented in step S415 is equal to 0 (YES in step S418), the processing proceeds to step S419. If in step S418 it is determined that the standby time "w" decremented in step S415 is not equal to 0 (NO in step S418), the processing returns to step S417.

In step S419, i.e., if in step S418 it is determined that the standby time "w" decremented in step S415 is equal to 0, the HDD power control unit 503 controls the ON/OFF switching unit 602 to stop the electric power supplied to the HDD 304 at this timing (second timing).

A similar result may also be obtained even if the flowchart illustrated in FIG. 16 is partly changed. For example, the flowchart may include a modified step S404 in which the value of "t" is not reset if the processing proceeds to step S404 via step S417. The flowchart may further include a modified step S405 in which the processing proceeds to step S406 irrespective of a determination result in step S405.

The processing illustrated in FIG. 16 may be advantageous in that the effects of the present exemplary embodiment can be obtained even when the value of "t" is deleted in response to the stop of the electric power supply to the CPU, compared to the above-described modified processing resulting from the processing illustrated in FIG. 16. The above-described modified processing resulting from the processing illustrated in FIG. 16 may also be advantageous in that it is possible that the processing can be simplified compared to the processing illustrated in FIG. 16.

In the above-described processing in step S410 or step S419, the CPU 301 stops supplying electric power to the HDD 304. Alternatively, the CPU 301 can reduce the amount of electric power supplied to the HDD 304. For example, as a method for reducing the electric power supplied to the HDD 304, it is possible to stop the electric power supplied to a motor that is configured to rotate a disk of the HDD 304. In this state, the CPU 301 cannot read and write data from and to the HDD 304.

Figure 17:
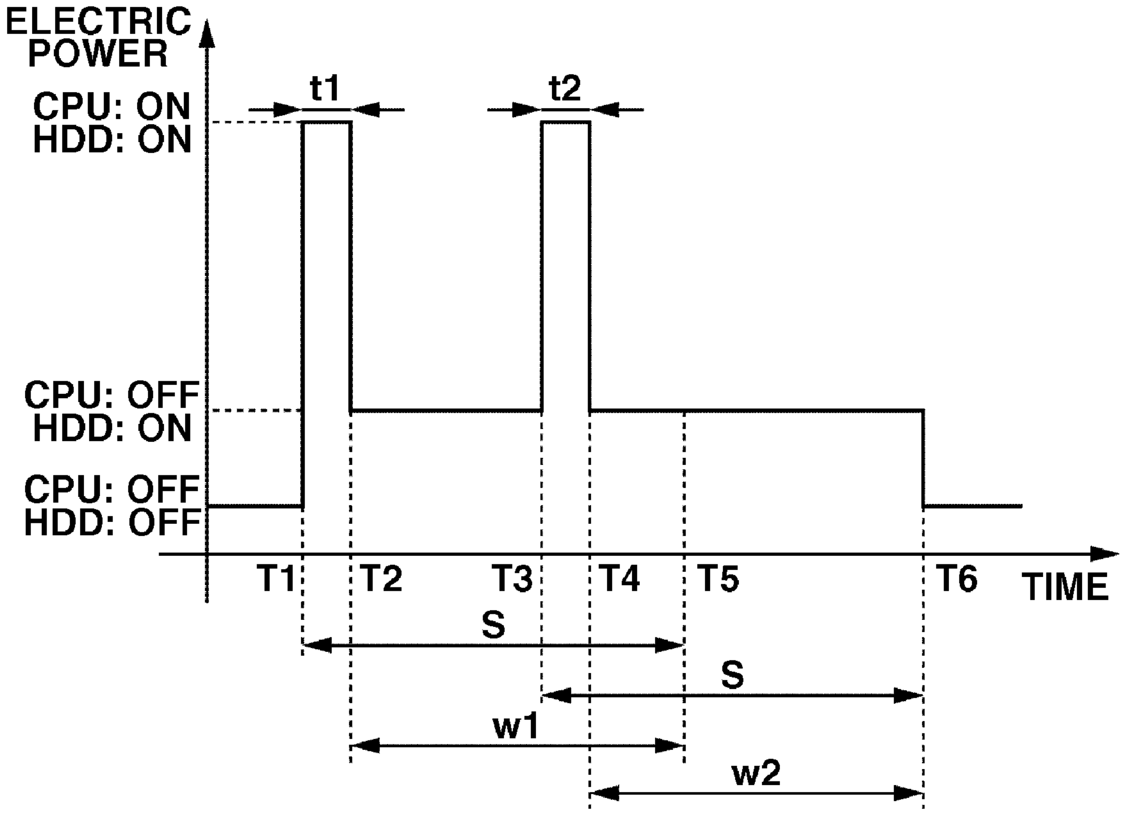
FIG. 17 illustrates a transitional state of power supply to a CPU and an HDD according to a conventional technique.

FIG. 17 illustrates a transitional state of power supply to a CPU and a HDD according to a conventional technique. In FIG. 17, the abscissa axis represents an elapsed time and the ordinate axis represents an amount of electric power consumption. The conventional technique calculates a standby time set after completing the job processing and before stopping electric power supply to the HDD by subtracting, from the reference time, an elapsed time in a state where electric power is supplied to the CPU. For example, the conventional technique may obtain a standby time "w2" at time T4 by subtracting a CPU power ON time t2 from the reference time "S."

Therefore, if a job is newly input after the electric power supply to the CPU is stopped and before the electric power supply to the HDD is stopped, it was impossible to appropriately stop the electric power supplied to the HDD 304. For example, when the standby time "w2" is set at time T4, the electric power supply to the HDD cannot be stopped at time T5.

Figure 18:
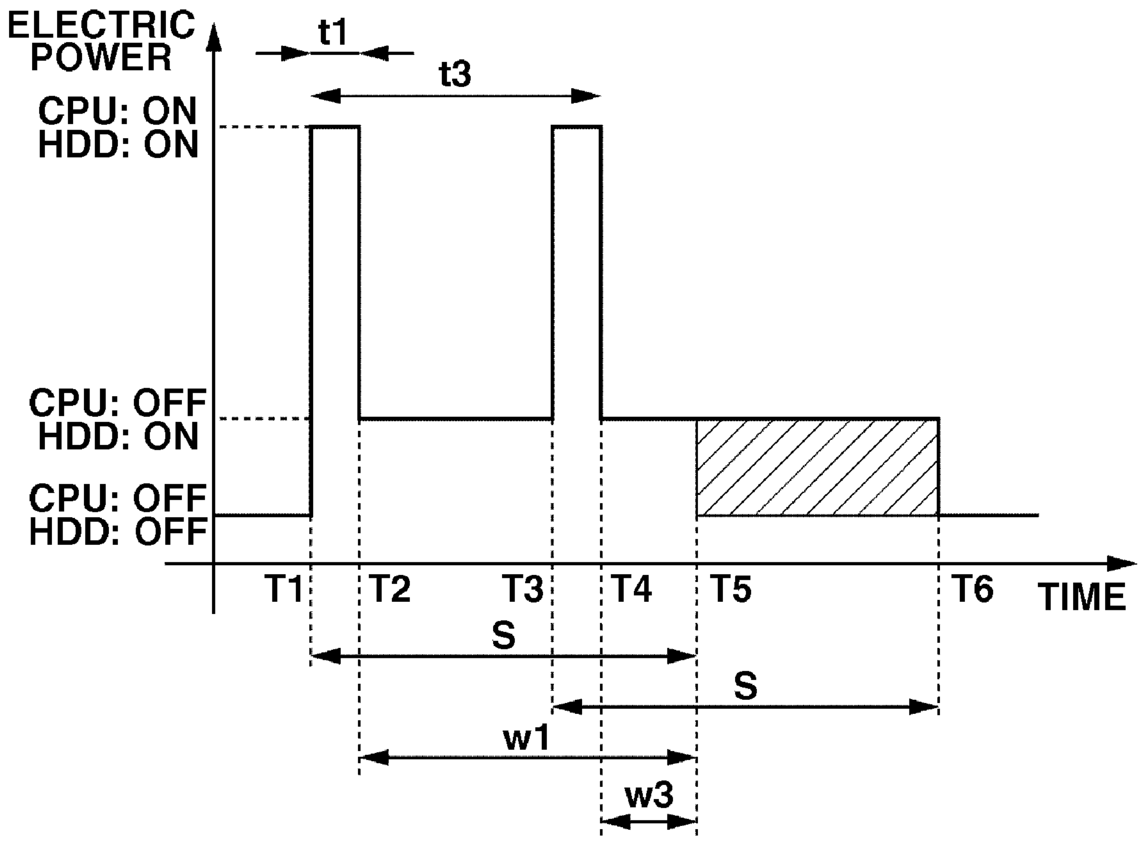
FIG. 18 illustrates a transitional state of power supply to a CPU and an HDD according to an exemplary embodiment.

FIG. 18 illustrates an example of a transitional state of power supply to the CPU and the HDD according to the present exemplary embodiment. In FIG. 18, the abscissa axis represents an elapsed time and the ordinate axis represents an amount of electric power consumption.

The present exemplary embodiment calculates a standby time set after completing the job processing and before stopping electric power supply to the HDD by subtracting, from the reference time, an elapsed time in a state where electric power is supplied to the HDD. For example, the present exemplary embodiment can obtain a standby time "w3" at time T4 by subtracting an HDD power ON time t3 from the reference time "S."

Therefore, even if a job is newly input after the electric power supply to the CPU is stopped and before the electric power supply to the HDD is stopped, the present exemplary embodiment can appropriately stop the electric power supplied to the HDD 304. For example, when the standby time "w3" is set at time T4, the electric power supply to the HDD 304 can be stopped at time T5.

As apparent from the comparison between FIG. 17 and FIG. 18, the present exemplary embodiment may be capable of reducing the amount of electric power consumption as indicated by a hatched portion illustrated in FIG. 18.

To realize aspects of the present invention, the above-described system or the apparatus can read software programs and/or computer-executable instructions from a storage medium and execute the program and/or computer-executable instructions to realize functions according to aspects of the above-described exemplary embodiments.

The storage medium having the program and/or computer-readable instructions read out therefrom can realize aspects according to the present invention. Accordingly, the storage medium storing the program and/or computer-executable instructions may constitute an aspect according to the present invention.

A storage medium supplying the program code and/or computer-executable instructions can be selected from any one or more of a floppy disk, a hard disk, a ROM, an optical disk, a magneto-optical (MO) disk, a compact disc-ROM (CD-ROM), a digital versatile disc (DVD (e.g., DVD-ROM, DVD-RAM)), a magnetic tape, and a memory card. Moreover, an operating system (OS) or other application software running on a computer can execute part or all of actual processing based on instructions of the programs to realize the functions according to the above-described exemplary embodiments.

Additionally, the program and/or computer-executable instructions can be written into a memory of a function expansion unit connected to a computer. In this case, based on instructions of the program and/or computer-executable instructions, a CPU provided on the function expansion unit can execute part or all of the processing to realize functions according to aspects of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2008-120406 filed May 2, 2008, and 2009-082082 filed Mar. 30, 2009, which are hereby incorporated by reference herein in their entirety.

What is claimed is:

1. An information processing apparatus comprising:

a storage unit configured to store data;

a supply unit configured to supply electric power to the storage unit;

a determination unit configured to determine whether to cause the information processing apparatus to operate in a power saving mode;

a measuring unit configured to measure an elapsed time until the determination unit determines to cause the information processing apparatus to operate in a power saving mode; and a control unit configured to control the supply unit to decrease electric power supplied from the supply unit to the storage unit at a timing determined based on the elapsed time and a predetermined reference time, in case that the determination unit determines to cause the information processing apparatus to operate in a power saving mode; and a recording unit configured to record a number of increment times when the power supply from the supply unit to the storage unit is increased, wherein the control unit is configured to control the supply unit to decrease electric power supplied from the supply unit to the storage unit at a first timing if the elapsed time is equal to or longer than a time obtained by multiplying the reference time by the number of increment times, and is configured to control the supply unit to decrease electric power supplied from the supply unit to the storage unit at a second timing that is later than the first timing if the elapsed time is shorter than the time obtained by multiplying the reference time by the number of increment times.

2. The information processing apparatus according to claim 1, wherein the second timing is a timing when a calculated time has elapsed after the determination unit determines to cause the information processing apparatus to operate in a power saving mode, wherein the calculated time can be obtained by subtracting the elapsed time from a time obtained by multiplying the reference time by the number of increment times.

3. The information processing apparatus according to claim 1, wherein the control unit is configured to control the supply unit to decrease electric power supplied from the supply unit to the storage unit at a first timing if the time having elapsed after the power supply to the storage unit is increased by the supply unit, of the elapsed time is equal to or longer than the reference time, and is configured to control the supply unit to decrease electric power supplied from the supply unit to the storage unit at a second timing that is later than the first timing if a time having elapsed after the power supply to the storage unit is increased by the supply unit, of the elapsed time is shorter than the reference time.

4. The information processing apparatus according to claim 3, wherein the second timing is a timing when a calculated time has elapsed after the determination unit determines to cause the information processing apparatus to operate in a power saving mode, wherein the calculated time can be obtained by subtracting, from the reference time, the time having elapsed after the power supply to the storage unit is increased by the supply unit, of the elapsed time.

5. The information processing apparatus according to claim 1, further comprising an execution unit configured to execute job processing based on the data stored in the storage unit, wherein the determination unit is configured to determine to cause the information processing apparatus to operate in a power saving mode if the execution unit completes the job processing and there is not any job to be subsequently processed.

6. The information processing apparatus according to claim 1, wherein the reference time is a time that can be calculated by dividing an operation time assured for the information processing apparatus, during which the information processing apparatus can operate without failure, by a number of times assured for the storage unit until which the electric power supply to the storage unit can be safely increased or reduced without causing any failure in the storage unit.

7. A method for controlling an information processing apparatus that includes a storage unit configured to store data and a supply unit configured to supply electric power to the storage unit, the method comprising:

determining whether to cause the information processing apparatus to operate in a power saving mode;

measuring an elapsed time until it is determined to cause the information processing apparatus to operate in a power saving mode; and controlling the supply unit to decrease electric power supplied from the supply unit to the storage unit at a timing determined based on the elapsed time and a predetermined reference time, in case that it is determined to cause the information processing apparatus to operate in a power saving mode; and recording a number of increment times when the power supply from the supply unit to the storage unit is increased, wherein the supply unit is controlled to decrease electric power supplied from the supply unit to the storage unit at a first timing if the elapsed time is equal to or longer than a time obtained by multiplying the reference time by the number of increment times, and wherein the supply unit is controlled to decrease electric power supplied from the supply unit to the storage unit at a second timing that is later than the first timing if the elapsed time is shorter than the time obtained by multiplying the reference time by the number of increment times.

* * * * *